(12) United States Patent
Dimitriadis et al.

(10) Patent No.: US 9,507,770 B2
(45) Date of Patent: *Nov. 29, 2016

(54) METHODS, SYSTEMS, AND PRODUCTS FOR LANGUAGE PREFERENCES

(71) Applicant: AT&T Intellectual Property I, L.P., Atlanta, GA (US)

(72) Inventors: Dimitrios B. Dimitriadis, Rutherford, NJ (US); Horst J. Schroeter, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,278

(22) Filed: Aug. 15, 2015

(65) Prior Publication Data

US 2016/0004689 A1    Jan. 7, 2016

Related U.S. Application Data

(63) Continuation of application No. 13/669,500, filed on Nov. 6, 2012, now Pat. No. 9,137,314.

(51) Int. Cl.
| | |
|---|---|
| *G06F 17/28* | (2006.01) |
| *H04W 52/02* | (2009.01) |
| *H04L 29/08* | (2006.01) |
| *G06F 3/16* | (2006.01) |

(52) U.S. Cl.
CPC ............. *G06F 17/28* (2013.01); *G06F 3/165* (2013.01); *H04L 67/18* (2013.01); *H04L 67/303* (2013.01); *H04W 52/0209* (2013.01)

(58) Field of Classification Search
CPC ....... G06F 17/28; G06F 3/165; H04L 67/303

USPC .......... 380/229; 381/77; 382/118, 128, 305; 434/219; 704/8, 275; 705/14, 55; 709/205; 715/737, 747, 753; 717/171
See application file for complete search history.

(56) References Cited

U.S. PATENT DOCUMENTS

| | | | |
|---|---|---|---|
| 4,863,384 A | 9/1989 | Slade | |
| 6,714,660 B1 | 3/2004 | Ohba | |
| 6,937,718 B2 | 8/2005 | Scholte | |
| 7,369,100 B2 | 5/2008 | Zacks et al. | |
| 8,005,680 B2* | 8/2011 | Kommer | G06Q 30/02 379/88.01 |
| 8,019,818 B2* | 9/2011 | Lorch | H04M 1/72552 345/418 |
| 8,190,645 B1 | 5/2012 | Bashaw | |
| 8,208,970 B2 | 6/2012 | Cheung et al. | |
| 8,230,367 B2 | 7/2012 | Bell et al. | |
| 8,468,581 B2 | 6/2013 | Cuende Alonso | |
| 8,509,730 B2 | 8/2013 | Kim | |
| 8,558,893 B1 | 10/2013 | Persson et al. | |
| 8,605,956 B2* | 12/2013 | Ross | G06K 9/00295 340/5.53 |
| 8,793,580 B2 | 7/2014 | Robinson | |
| 8,832,564 B2* | 9/2014 | McCoy | H04N 21/47 715/721 |
| 8,917,913 B2* | 12/2014 | Kritt | G06K 9/00677 340/5.52 |
| 8,942,109 B2 | 1/2015 | Dorenbosch et al. | |
| 9,087,357 B2* | 7/2015 | Gershon | G09G 5/022 |
| 9,137,314 B2* | 9/2015 | Dimitriadis | H04L 67/303 |

(Continued)

*Primary Examiner* — Gerald Gauthier
(74) *Attorney, Agent, or Firm* — Scott P. Zimmerman, PLLC

(57) ABSTRACT

Methods, systems, and computer program products provide personalized feedback in a cloud-based environment. A client device routes image data to a server for analysis. The server analyzes the image data to recognize people of interest. Because the server performs image recognition, the client device is relieved of these intensive operations.

20 Claims, 21 Drawing Sheets

(56) References Cited

U.S. PATENT DOCUMENTS

| | | |
|---|---|---|
| 2004/0113939 A1 | 6/2004 | Zacks et al. |
| 2004/0148197 A1 | 7/2004 | Kerr et al. |
| 2004/0208324 A1 | 10/2004 | Cheung et al. |
| 2005/0057491 A1 | 3/2005 | Zacks et al. |
| 2005/0180582 A1 | 8/2005 | Guedalia |
| 2005/0272416 A1 | 12/2005 | Ooi et al. |
| 2006/0078859 A1* | 4/2006 | Mullin ............... G03G 15/5016 434/219 |
| 2007/0147610 A1* | 6/2007 | Kethi Reddy ..... H04N 1/32128 380/229 |
| 2007/0165866 A1 | 7/2007 | Super |
| 2007/0258108 A1* | 11/2007 | Matsumoto .......... G06Q 10/087 358/1.15 |
| 2008/0109159 A1* | 5/2008 | Shi ........................ G01C 21/32 701/421 |
| 2008/0140652 A1 | 6/2008 | Millman et al. |
| 2008/0252596 A1 | 10/2008 | Bell et al. |
| 2010/0031298 A1 | 2/2010 | Iwanami et al. |
| 2010/0041330 A1 | 2/2010 | Elg |
| 2010/0302401 A1 | 12/2010 | Oku et al. |
| 2011/0096963 A1* | 4/2011 | Shekhara ............. G06F 19/321 382/128 |
| 2011/0248935 A1 | 10/2011 | Mellow et al. |
| 2011/0316996 A1 | 12/2011 | Abe et al. |
| 2012/0035907 A1* | 2/2012 | Lebeau ................... G06F 17/28 704/2 |
| 2012/0066607 A1* | 3/2012 | Song ..................... G06F 9/5077 715/737 |
| 2012/0072898 A1* | 3/2012 | Pappas .................. G06F 21/10 717/171 |
| 2012/0078720 A1* | 3/2012 | Pappas ..................... G06F 8/38 705/14.55 |
| 2012/0124603 A1 | 5/2012 | Amada |
| 2012/0163625 A1 | 6/2012 | Siotis et al. |
| 2012/0230512 A1 | 9/2012 | Ojanper |
| 2012/0254382 A1 | 10/2012 | Watson et al. |
| 2013/0254647 A1 | 9/2013 | Amacker et al. |
| 2013/0286860 A1 | 10/2013 | Dorenbosch et al. |
| 2014/0063057 A1 | 3/2014 | Eronen et al. |
| 2014/0098240 A1 | 4/2014 | Dimitriadis et al. |
| 2014/0108962 A1* | 4/2014 | Olomskiy ............. G06Q 10/10 715/753 |
| 2014/0126741 A1* | 5/2014 | Dimitriadis .......... H04L 67/303 381/77 |
| 2015/0078681 A1* | 3/2015 | Damola ............. G06K 9/00221 382/305 |
| 2016/0004689 A1* | 1/2016 | Dimitriadis .......... H04L 67/303 704/8 |

\* cited by examiner

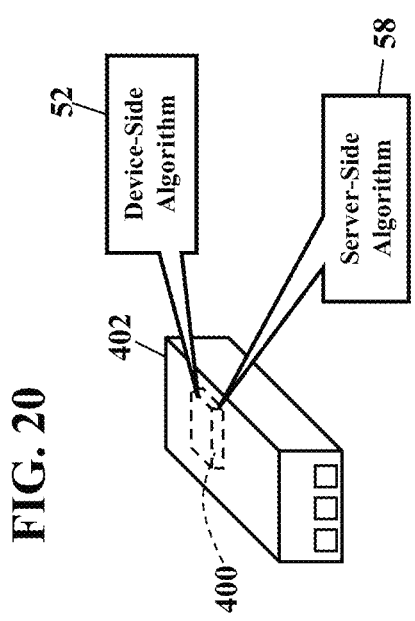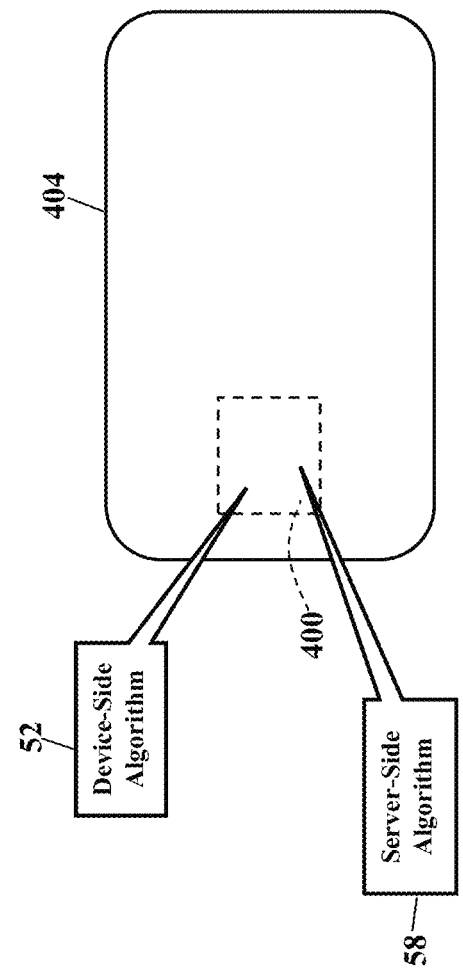

METHODS, SYSTEMS, AND PRODUCTS FOR LANGUAGE PREFERENCES

CROSS-REFERENCE TO RELATED APPLICATION

This application is a continuation of U.S. application Ser. No. 13/669,500 filed Nov. 6, 2012 and since issued as U.S. Pat. No. 9,137,314, and incorporated herein by reference in its entirety.

BACKGROUND

Video and audio processing require intensive operations. Processors and memory may be taxed and even overwhelmed when executing image and audio instructions. Indeed, in today's mobile environment, video and audio processing can waste limited processing and battery resources.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 19-21 are schematics further illustrating various client devices for presenting personalized feedback, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
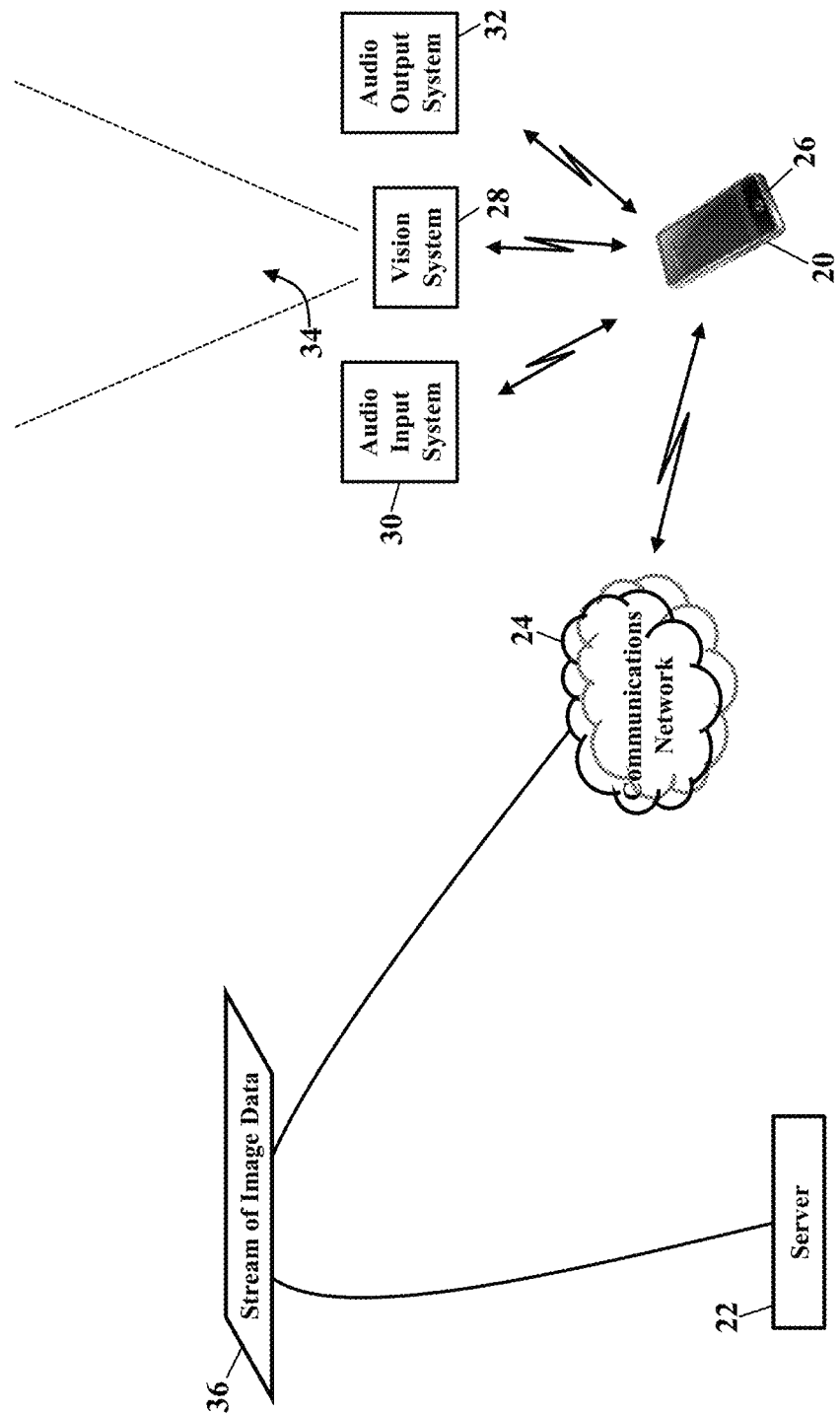
FIGS. 1-3 are simplified schematics illustrating an environment in which exemplary embodiments may be implemented.
Figure 2:
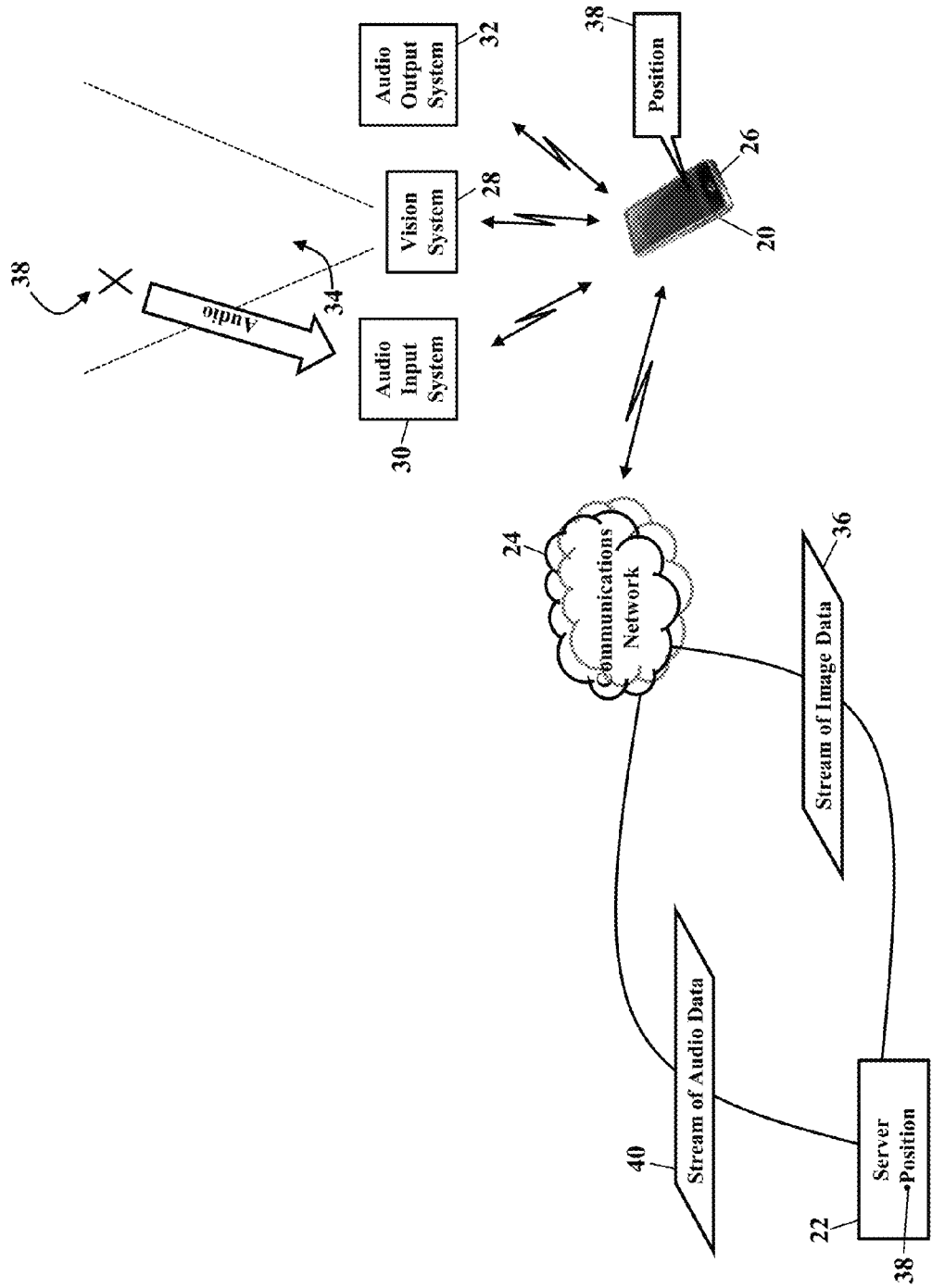
Figure 3:
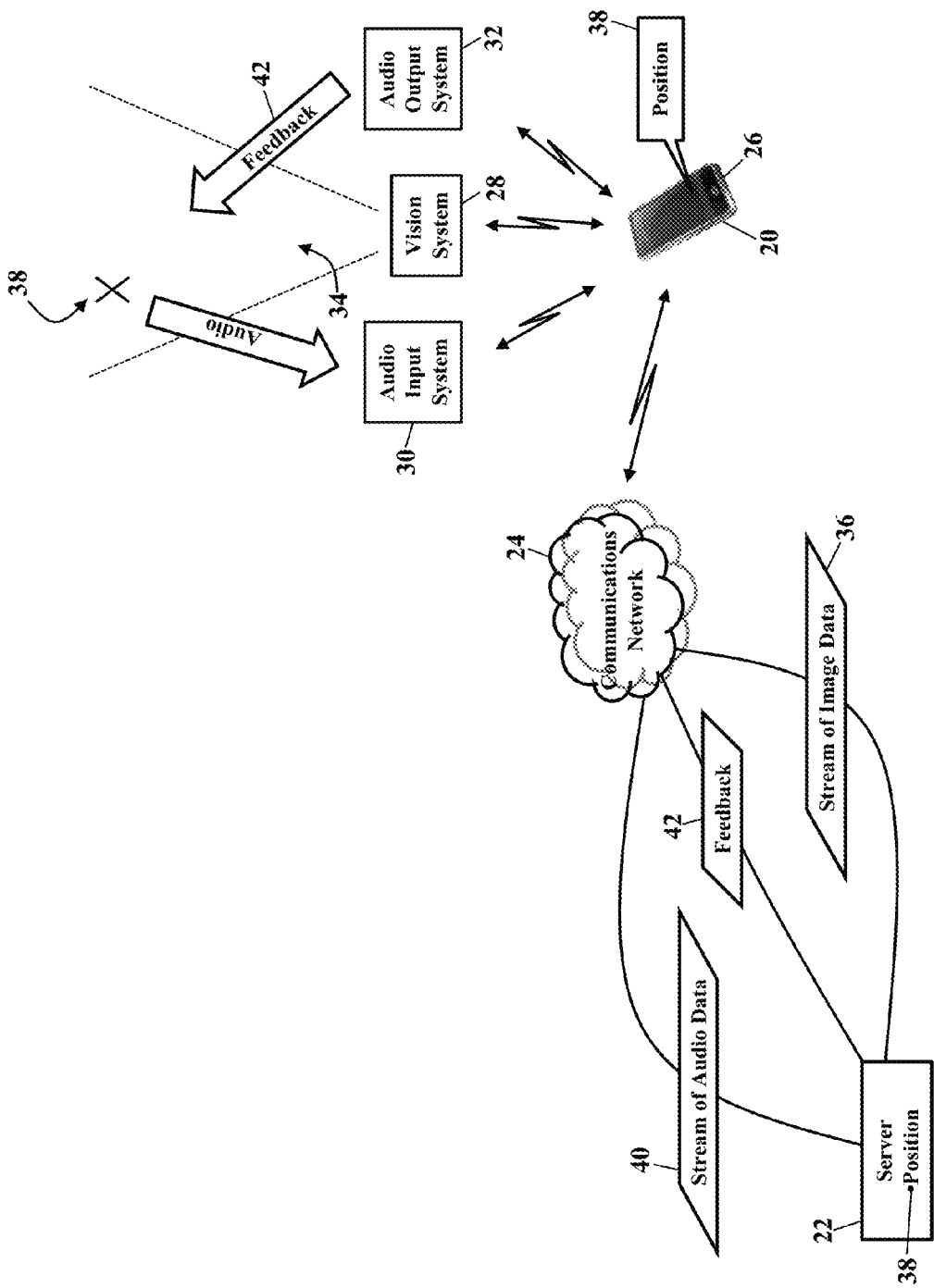

FIGS. 1-3 are simplified schematics illustrating an environment in which exemplary embodiments may be implemented. FIG. 1 illustrates a client device 20 communicating with a server 22 via a communications network 24. The client device 20 is illustrated as a smart phone 26, but the client device 20 may be a computer, a set-top receiver, or any other processor-controlled device. Whatever the client device 20, the client device 20 interfaces with a vision system 28, an audio input system 30, and an audio output system 32. The client device 20 uses the vision system 28 to scan a physical space 34 and to obtain a stream 36 of image data. The stream 36 of image data is analyzed to aim the audio input system 30 and/or the audio output system 32. That is, the client device 20 aligns its audio input system 30 and/or its audio output system 32 to people and/or objects recognized in the physical space 34.

Here, though, analysis is cloud-based. The client device 20 uploads the stream 36 of image data to the server 22 for analysis. The server 22 then analyzes the stream 36 of image data to recognize people and objects of interest. As the reader may know, image recognition may require significant processing and memory resources. Exemplary embodiments thus relieve the client device 20 of these intensive operations. The client device 20 routes, sends, or forwards the stream 36 of image data to the server 22 for analysis. The server 22 analyzes the stream 36 of image data and recognizes people and/or objects of interest.

The server 22 generates instructions for the client device 20. Once the server 22 recognizes the people or objects of interest, the server 22 may then instruct the client device 20 where to aim the audio input system 30. As FIG. 2 illustrates, for example, the server 22 may determine a position 38 of a recognized person in a room under surveillance. The server 22 may then send the position 38 of the person back to the client device 20. When the client device 20 receives the position 38, the client device 20 may then point the audio input system 30 toward the position 38 of the recognized person. The audio input system 30 thus receives audio from the direction of the position 38 determined by the server 22. The client device 20 may thus capture a stream 40 of audio data from the direction of the position 38 of the recognized person.

FIG. 3 illustrates more network reliance. The stream 40 of audio data may be analyzed for its semantic content, such as spoken commands and phrases. Audio processing, though, may also require significant processing and memory resources. Exemplary embodiments may thus again relieve the client device 20 of these intensive operations. The client device 20 may thus upload the stream 40 of audio data to the server 22 for analysis. The server 22 analyzes the stream 40 of audio data to determine any semantic content. The server 22 may then generate audible feedback 42. The feedback 42 may be an answer, phrase, or response to the semantic content contained within the stream 40 of audio data. Whatever the feedback 42, the server 22 sends the feedback 42 to the client device 20.

As FIG. 3 illustrates, the client device 20 may beam the feedback 42 to the recognized person. Because the server 22 has determined the position 38 of the recognized person, the client device 20 may aim the feedback 42 to the same position 38. The client device 20 may thus aim its audio output system 32 to the same position 38 within the physical space 34. The client device 20 may thus instruct the audio output system 32 to point toward the position 38 of the recognized person. The client device 20 may thus align the feedback 42 beam of sound in the direction of the position 38.

Exemplary embodiments thus establish personalized, bi-directional, web-based communication. Conventional natural speech systems require intensive processing capabilities that can bog down modern mobile devices. Exemplary embodiments, though, offload intensive video and audio processing to the web-based server 22. Mobile client devices, such as smart phones and tablet computers, may thus provide natural, synthesized speech without powerful hardware componentry and intensive battery consumption. The client device 20 merely aims its audio input system 30 and/or its audio output system 32 according to the position 38 calculated by the server 22.

Figure 4:
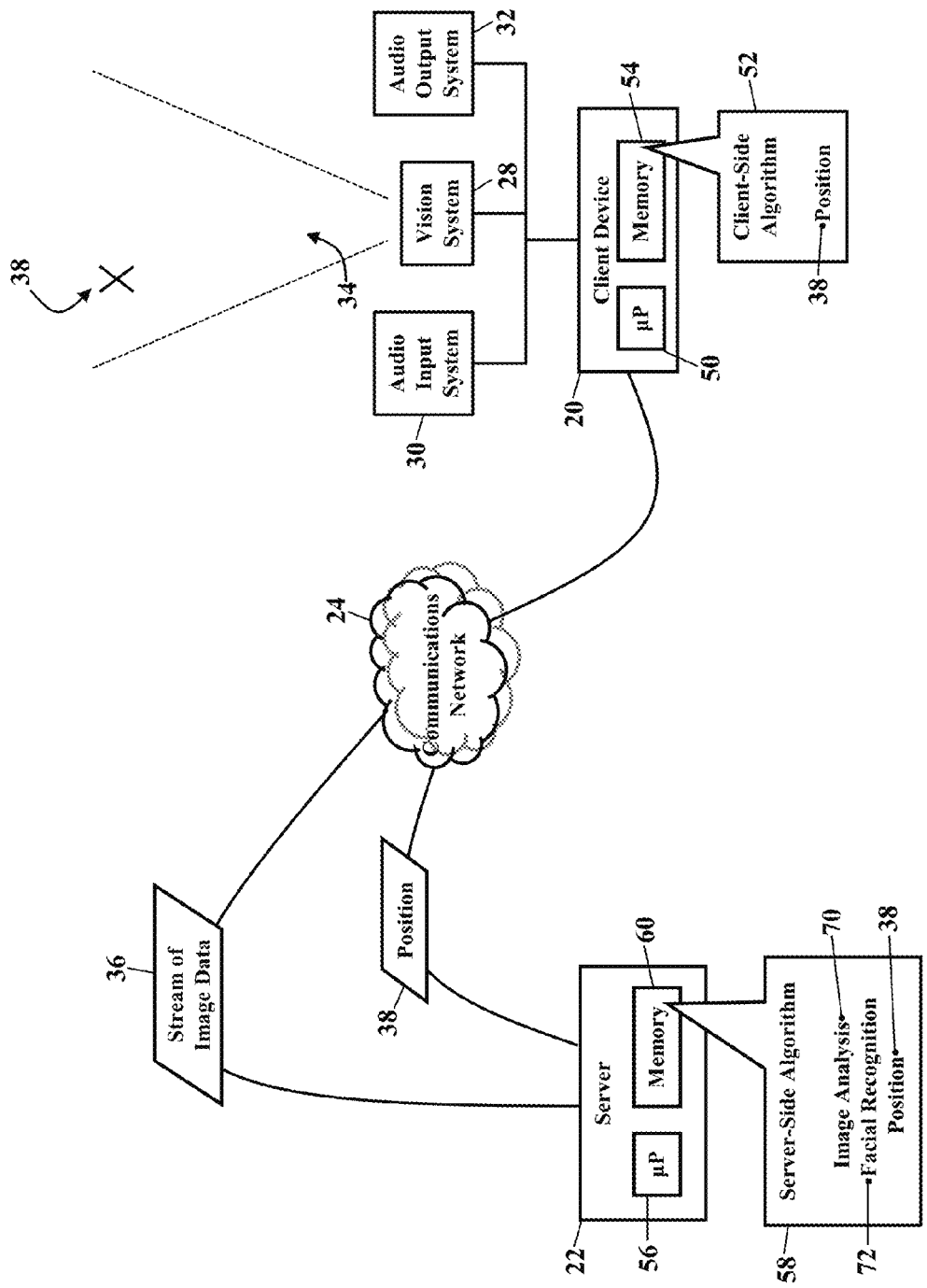
FIGS. 4-5 are more detailed block diagrams illustrating the operating environment, according to exemplary embodiments.
Figure 5:
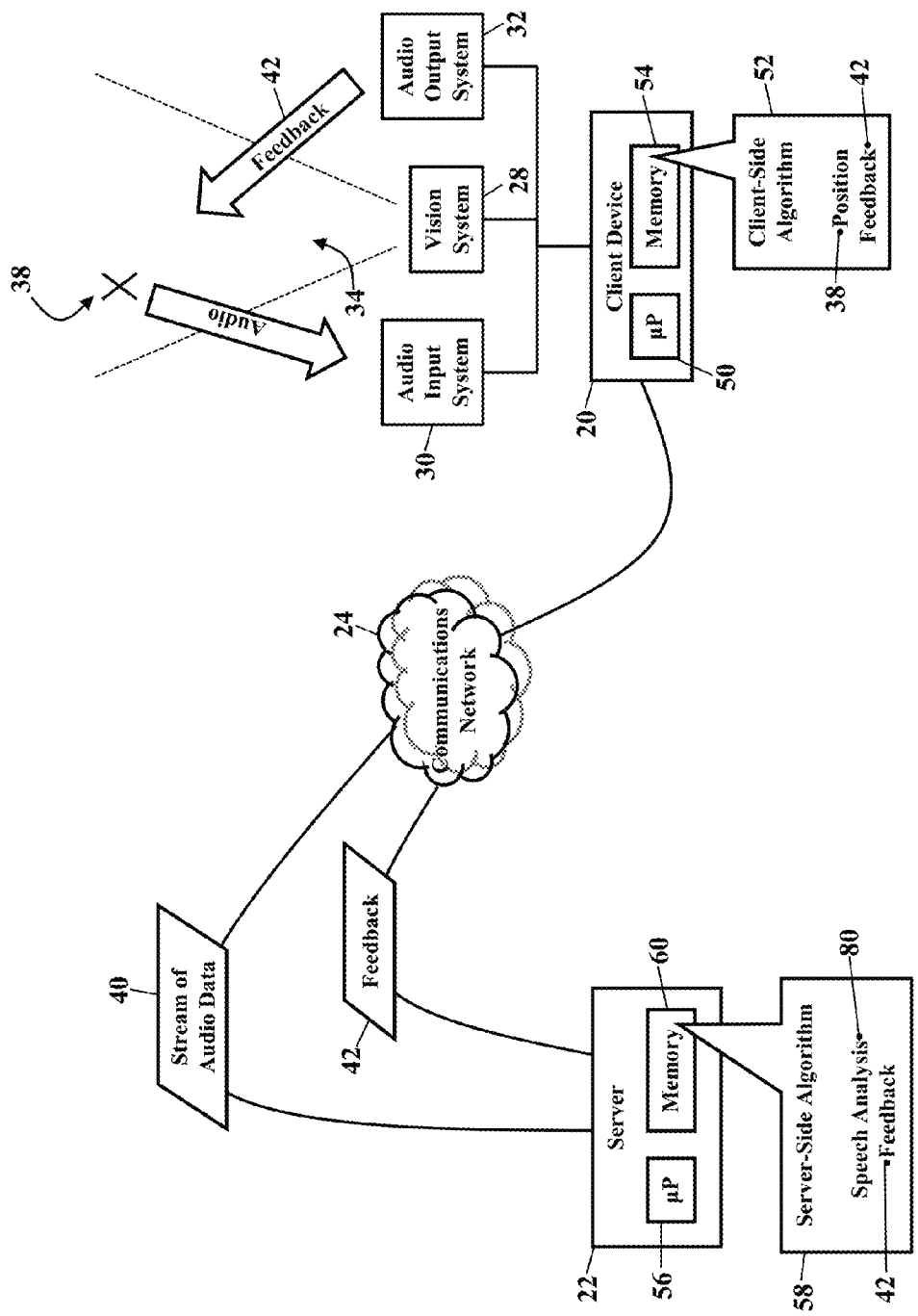

FIGS. 4-5 are more detailed block diagrams illustrating the operating environment, according to exemplary embodiments. Here the client device 20 has a processor 50 (e.g., "μP"), application specific integrated circuit (ASIC), or other component that executes a client-side algorithm 52 stored in a memory 54. The server 22 may also have a processor 56 (e.g., "μP"), application specific integrated circuit (ASIC), or other component that executes a server-side algorithm 58 stored in a memory 60. The client-side algorithm 52 and the server-side algorithm 58 are programming, code, or instructions that cooperate in a client-server relationship to provide personalized and synthesized bi-directional communication. The client-side algorithm 52 instructs the processor 50 to receive the stream 36 of image data from the vision system 28. The stream 36 of image data may comprise still images and/or video of the physical space 34. The client-side algorithm 52 instructs the processor 50 to route the stream 36 of image data into and along the communications network 24 to the network address associated with the server 22.

The server 22 analyzes the stream 36 of image data. When the server 22 receives the stream 36 of image data, the server-side algorithm 58 instructs the server 22 to perform an image analysis 70. The image analysis 70 is executed to recognize one or more persons and/or objects in the stream 36 of image data. Any image analysis 70 may be performed, such as facial recognition 72 of a face in the stream 36 of image data. Regardless, once a person (or object) of interest is recognized, the server 22 may then determine the position 38 of the recognized person relative to the physical space 34 shown in the stream 36 of image data. The server 22 sends the position 38 to the network address associated with the client device 20, and the client device 20 further refines the vision system 28 to the position 38 of the recognized person.

As FIG. 5 illustrates, the client device 20 also sends the stream 40 of audio data. The client device 20 interfaces with its audio input system 30 to generate the stream 40 of audio data. As the position 38 is known, the client device 20 may also align the audio input system 30 to the same position 38. The position 38 may thus serve as positional feedback when aiming the audio input system 30. When the stream 40 of audio data is generated, the client-side algorithm 52 instructs the processor 50 to route the stream 40 of audio data into and along the communications network 24 to the network address associated with the server 22.

The server 22 analyzes the stream 40 of audio data. When the server 22 receives the stream 40 of audio data, the server-side algorithm 58 instructs the server 22 to perform a speech analysis 80. The speech analysis 80 is executed to recognize the semantic content contained within the stream 40 of audio data. While any speech analysis 80 may be performed, speech-to-text translation may be preferred due to its availability and inexpensive cost. Regardless, once the semantic content is determined, the feedback 42 is generated. The server 22 routes the feedback 42 into and along the communications network 24 to the network address associated with the client device 20.

The client device 20 then aims its audio output system 32. When the feedback 42 is received, the client device 20 also aligns its audio output system 32 to the position 38 determined by the server 22. The client device 20 thus points a beam of sound to the position 38 of the recognized person, thus providing the personalized audio feedback 42.

Exemplary embodiments isolate the feedback 42. Because the audio feedback 42 is beamed to the position 38 of the recognized person, the audio feedback 42 is personal and unheard by others in the same physical space 34. That is, even if a crowd of people mingle in a room, exemplary embodiments may narrowly beam the audio feedback 42 to only the location of the recognized person. The recognized person, for example, may ask questions to the client device 20, and the client device 20 aims an audible answer back to the recognized person, without sending audio cues to the crowd. As the recognized person moves about the room, exemplary embodiments may track the movements, listen in, and provide the personalized feedback 42 based on audible interactions with the client device 20. Exemplary embodiments thus establish a bidirectional communication channel that follows the movements of the recognized person.

Figure 6:
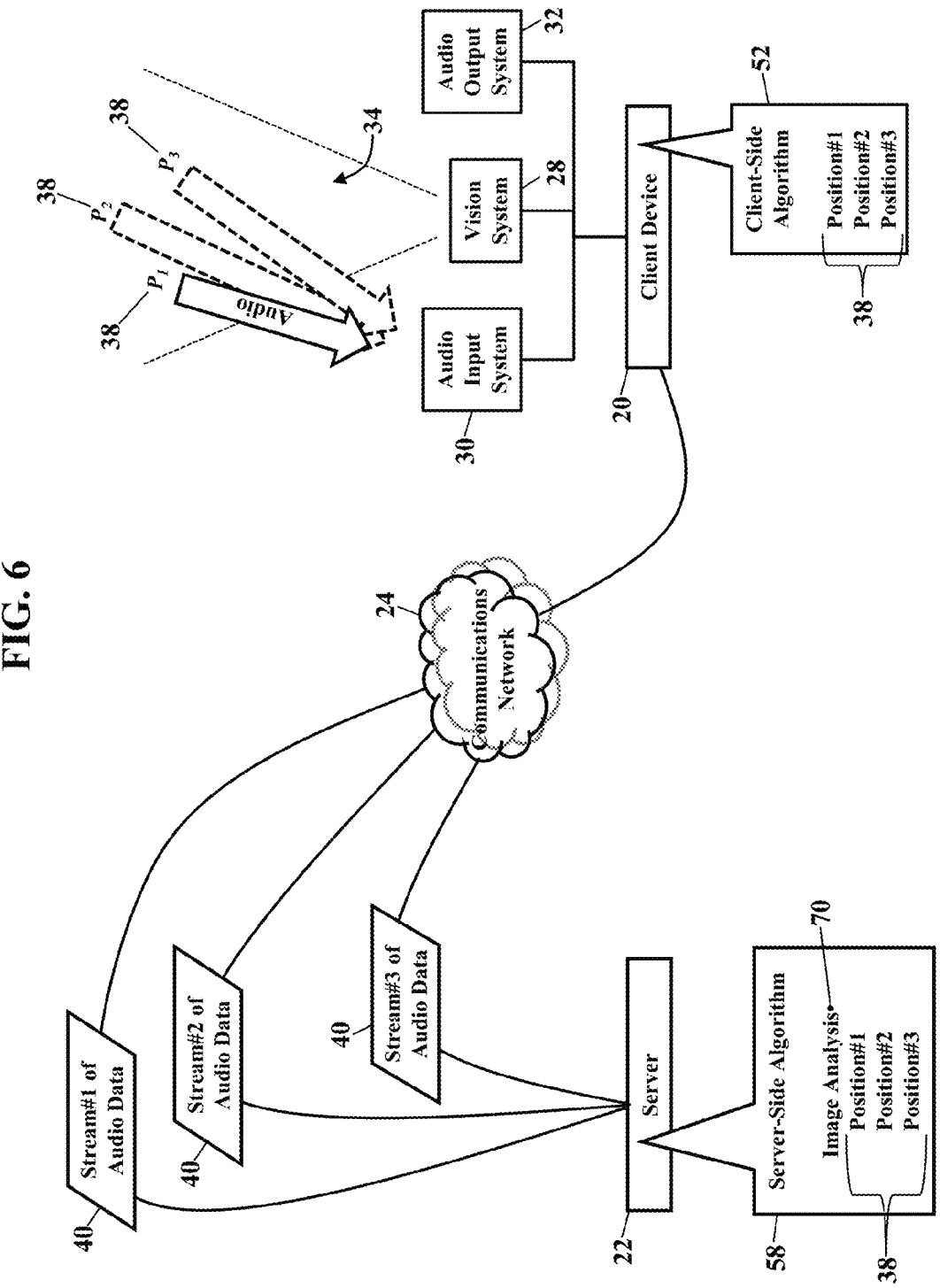
FIGS. 6-7 are schematics illustrating personalized feedback, according to exemplary embodiments.
Figure 7:
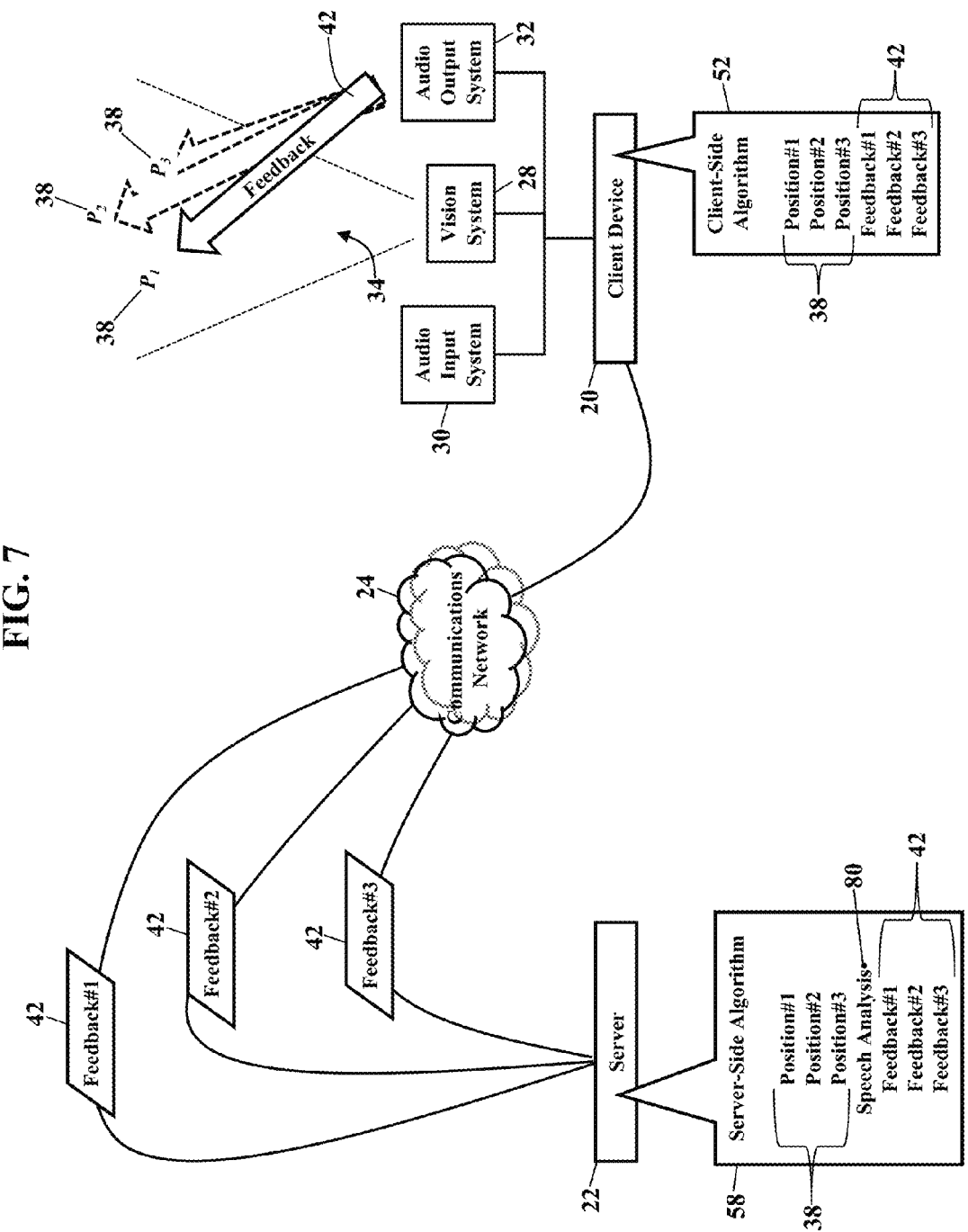

FIGS. 6-7 are schematics further illustrating the personalized feedback 42 in a crowd, according to exemplary embodiments. Here exemplary embodiments may be applied to multiple, recognized people in a crowd. That is, as the vision system 28 pans a room, the server 22 may recognize multiple people in the physical space 34. The server 22 may thus determine multiple positions 38, with each position 38 (illustrated as $P_N$) corresponding to each recognized person in the physical space 34. The client device 20 may thus be instructed to aim its audio input system 30 to capture multiple streams 40 of audio data. The audio input system 30, for example, may have an array of microphones, with each individual microphone individually aimed to the respective position 38 of each recognized person. The client device 20 may thus send or route separate streams 40 of audio data to the server 22 for analysis. The server 22 thus performs the speech analysis 80 for each stream 40 of audio data.

As FIG. 7 illustrates, the feedback 42 is generated. Because the multiple streams 40 of audio data were received, the server 22 may generate multiple streams of the audio feedback 42. Each feedback 42 is responsive to the semantic content of each corresponding stream 40 of audio data. The server 22 may thus send multiple streams of the audio feedback 42 to the client device 20. If the audio output system 32 includes multiple directional speakers, then the client device 20 may dedicate each speaker to one of the recognized people. The client device 20 may thus instruct the audio output system 32 to aim each dedicated speaker to the direction of the position 38 of each recognized person. The audio output system 32 thus outputs one of the multiple streams of the audio feedback 42 to each recognized person. As the recognized people mingle about the physical space 34, exemplary embodiments may provide personal feedback 42 that is unheard by others in the crowd.

Figure 8:
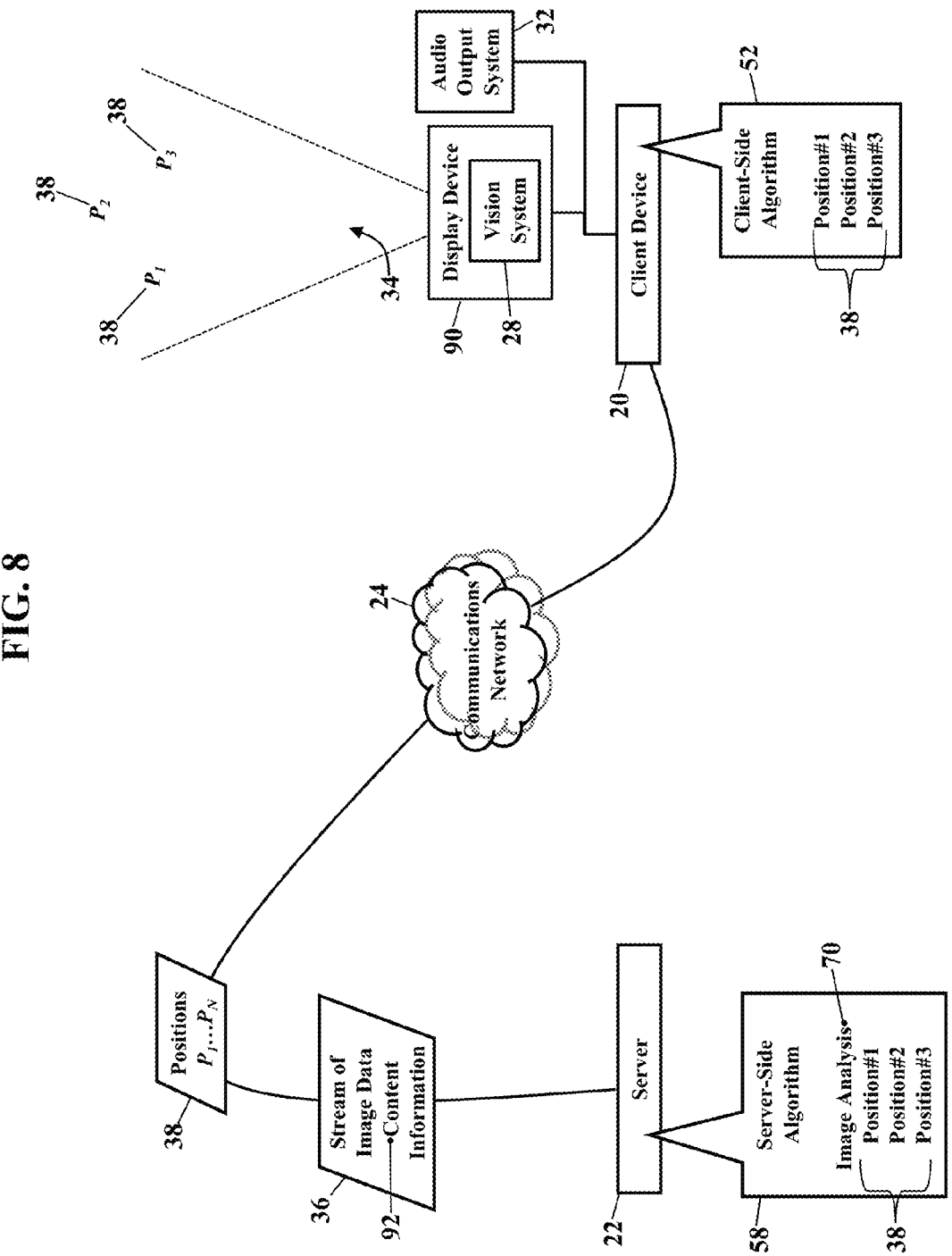
FIGS. 8-9 are schematics illustrating language capabilities, according to exemplary embodiments.
Figure 9:
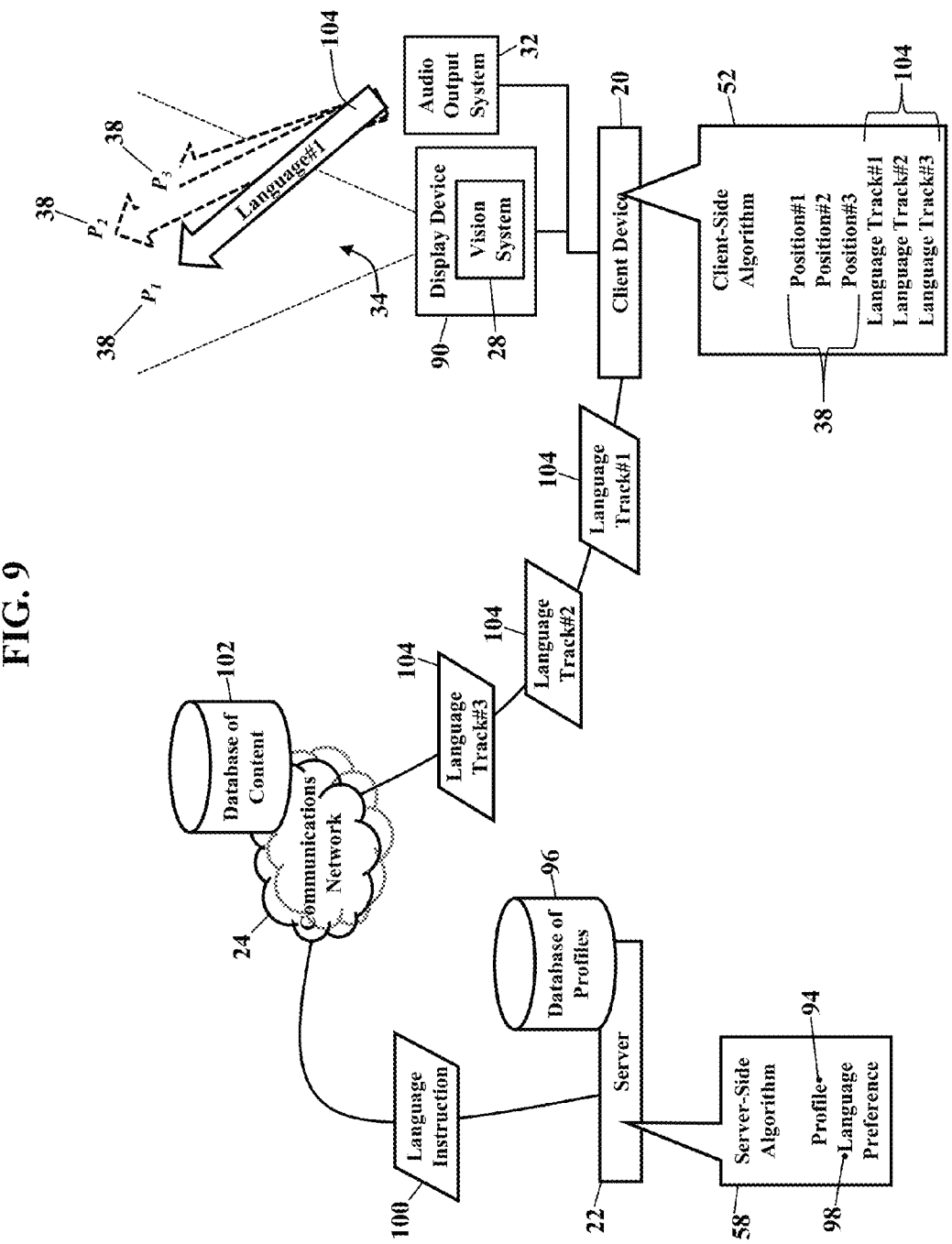

FIGS. 8-9 are schematics illustrating language capabilities, according to exemplary embodiments. As the audio output system 32 may output different streams of the audio feedback 42, FIGS. 8-9 illustrate how exemplary embodiments may beam preferred languages to recognized users. Exemplary embodiments, in other words, may narrowly beam different audio feedback 42 to each recognized person, such as each person's preferred language.

Suppose, for example, multiple people watch a movie in the same media room. As FIG. 8 illustrates, the client device 20 interfaces with a display device 90 to project or display the movie to the physical space 34. As the display device 90 presents the movie or other content, the vision system 28 scans the physical space 34. The client device 20 sends or routes the stream 36 of image data to the server 22 (as earlier paragraphs explained), along with content information 92. The content information 92 describes the content being displayed by the display device 90, such as a title of a movie or other program being displayed. The server-side algorithm 58 performs or invokes the image analysis 70 and determines the positions 38 of the recognized users within the physical space 34, as earlier paragraphs explained. The server-side algorithm 58 shares the positions 38 with the client device 20, also as earlier paragraphs explained.

As FIG. 9 illustrates, the server 22 may then determine preferred language tracks. When the server-side algorithm 58 recognizes a user, the server-side algorithm 58 may query for the user's corresponding profile 94. The server 22 queries a database 96 of profiles for an identity of the recognized user. The database 96 of profiles is illustrated as being locally stored in the server 22, but the database 96 of profiles may be remotely stored and accessed from any network location within the communications network 24. Regardless, as each user is recognized, the server 22 may associate the recognized face with the corresponding name. The server 22 queries the database 96 of profiles for each recognized user's name, and the server 22 retrieves the corresponding profile 94. Each user's corresponding profile 94 may store a language preference 98. The server-side algorithm 58 retrieves each recognized user's language preference 98. The server-side algorithm 58 may then send a language instruction 100 to a database 102 of content. The language instruction 100 instructs the database 102 of content to retrieve a language track 104 associated with the content information 92. If the recognized user prefers German, for example, then the database 102 of content retrieves a German language track 104. The language instruction 100 also instructs the database 102 of content to route the language track 104 to the network address associated with the client device 20.

The client device 20 thus aims the user's preferred language. As this disclosure explains, the server 22 has determined the respective positions 38 of the recognized users. The client device 20 may thus instruct the audio output system 32 to dedicate and aim its output devices to the respective positions 38 of each recognized user. That is, as the display device 90 displays the movie, the audio output system 32 beams each user's preferred language track 104 to their respective position 38. The recognized user thus enjoys the movie according to her language preference 98.

Exemplary embodiments are especially helpful in multi-language environments. As multiple people view the movie, exemplary embodiments may beam different language tracks to different people. The image analysis 70 may be used to recognize several different people within a presentation space of the display device 90. Each different, recognized person may have a different language preference 98. One person may prefer an English language track 104, another person may prefer a German language track 104, and yet another person may prefer a Spanish language track 104. As the server 22 consults each recognized person's profile 94, the server 22 may set-up each person's different language track 104. The multiple language tracks 104 may be streamed to the client device 20, and the audio output system 32 beams each person's preferred language track 104 to their respective positions 38. The multiple people thus enjoy the same, common visual content, but each person may enjoy a different, but personal, language track 104. Because each person's language track 104 is isolated to their respective position 38, the other language tracks 104 are unheard by the other viewers in the same physical space 34.

Exemplary embodiments may be applied to other scenarios. As the users view the content on the display device 90, suppose one of the users wishes to call a friend. Even though separate channels have been established with the server 22, one of the users may audibly utter a command to "call" to a "name." The client device 20 and the server 22 may cooperate to initiate the call, while the client device 20 continues receiving and displaying content on the display device 90. So, in parallel, one of the users may speak commands to change the displayed content (such as "change channel"), while the other viewing user converses over the established call. The client device 20 and the server 22 may thus also cooperate to suppress cross-talk, thus reducing or eliminating the channel change commands from compromising the other user's call (and vice versa). Further, the client device 20 and the server 22 also cooperate to project or beam different audio to each user, thus isolating the call from the other's commands. Exemplary embodiments, in other words, directionally deliver each person's personal audio without mixing.

Input audio may thus be received. As the users enjoy the movie, exemplary embodiments may still interpret their speech. As this disclosure explains, the client device 20 may also aim the audio input system 30. As the recognized users enjoy the content and their respective language track 104, the client device 20 may also aim the audio input system (illustrated as reference numeral 30) to the different positions 38 of the viewers. As this disclosure explained, the audio input system 30 may have individual microphones that are individually aimed to the position 38 of each recognized viewer. The client device 20 may thus receive and forward the separate streams 40 of audio data to the server 22 for analysis, as FIG. 6 illustrates. Any viewer may thus issue a spoken command that is recognized and executed. The server 22 may also generate the audio feedback 42 in response to any command or question in any stream 40 of audio data. The feedback 42 may also be aligned to the position 38 of the speaker, thus ensuring the feedback 42 is unheard by other viewers in the physical space 34.

Figure 10:
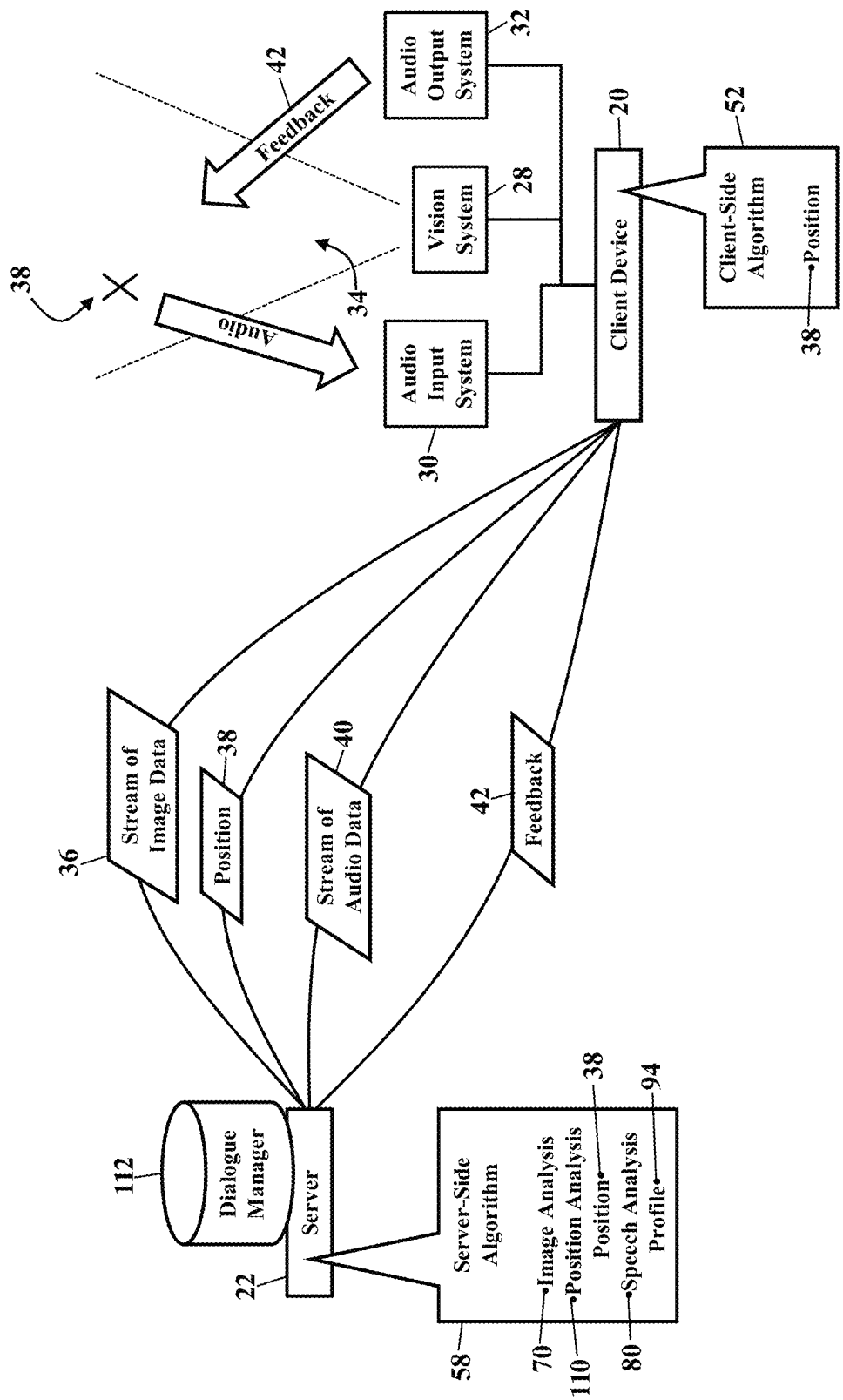
FIG. 10 is another detailed schematic illustrating the operating environment, according to exemplary embodiments.

FIG. 10 is another detailed schematic illustrating the operating environment, according to exemplary embodiments. FIG. 10 illustrates the server 22 receiving the stream 36 of image data and the stream 40 of audio data. The server 22 performs the image analysis 70 to recognize one or more people from the stream 36 of image data. When a particular face is recognized, the server 22 performs a position analysis 110. The server 22 thus determines the position 38 of the recognized face from the stream 36 of image data.

The client device 20 responds to the position 38. Once the position 38 of the recognized face is determined, the server 22 may send the position 38 to the client device 20. The client device 20 may use the position 38 to orient the vision system 28 and the audio input system 30. That is, the client device 20 aims or aligns its cameras and microphones according to the position 38 determined by the server 22. As the recognized face moves, the position 38 may be repeatedly determined as feedback to the client device 20. The client device 20 is thus able to train its cameras and microphones to the roving, recognized face.

The server 22 also generates the feedback 42. When the server 22 receives the stream 40 of audio data, the server 22 calls or invokes the speech analysis 80. The speech analysis 80 provides a real-time interaction with any recognized user. The server 22 may process the stream 40 of audio data to suppress all but the recognized user's audio input. If multiple people are recognized, exemplary embodiments may simultaneously track and listen to all the recognized users present in the room, through multiple instantiations applied as one instance per individual user. The speech analysis 80 may perform a speech-to-text translation to convert the stream 40 of audio data into text. The server 22 may then send or feed the text to a dialogue manager 112. The dialogue manager 112 analyzes the text for recognized commands, phrases, and other semantic content. The dialogue manager 112 generates the acoustic feedback 42. The dialogue manager 112 may perform a text-to-speech translation that converts the acoustic feedback 42 into speech. However the feedback 42 is obtained, the feedback 42 is routed back to the client device 20 for directional delivery. The client device 20 pinpoints its audio output system 32 to the position 38 of the recognized user, thus delivering the personalized feedback 42 to the user. Because the feedback 42 directed to the position 38, though, the feedback 42 remains mostly inaudible to other users in the same room.

The feedback 42 is based on audio signals that are largely inaudible to the rest of the users because of narrow (highly-directive) beaming of audio. The server 22 may thus deliver audio content that may be different for the individual users, as dictated by their personal profile 94.

Figure 11:
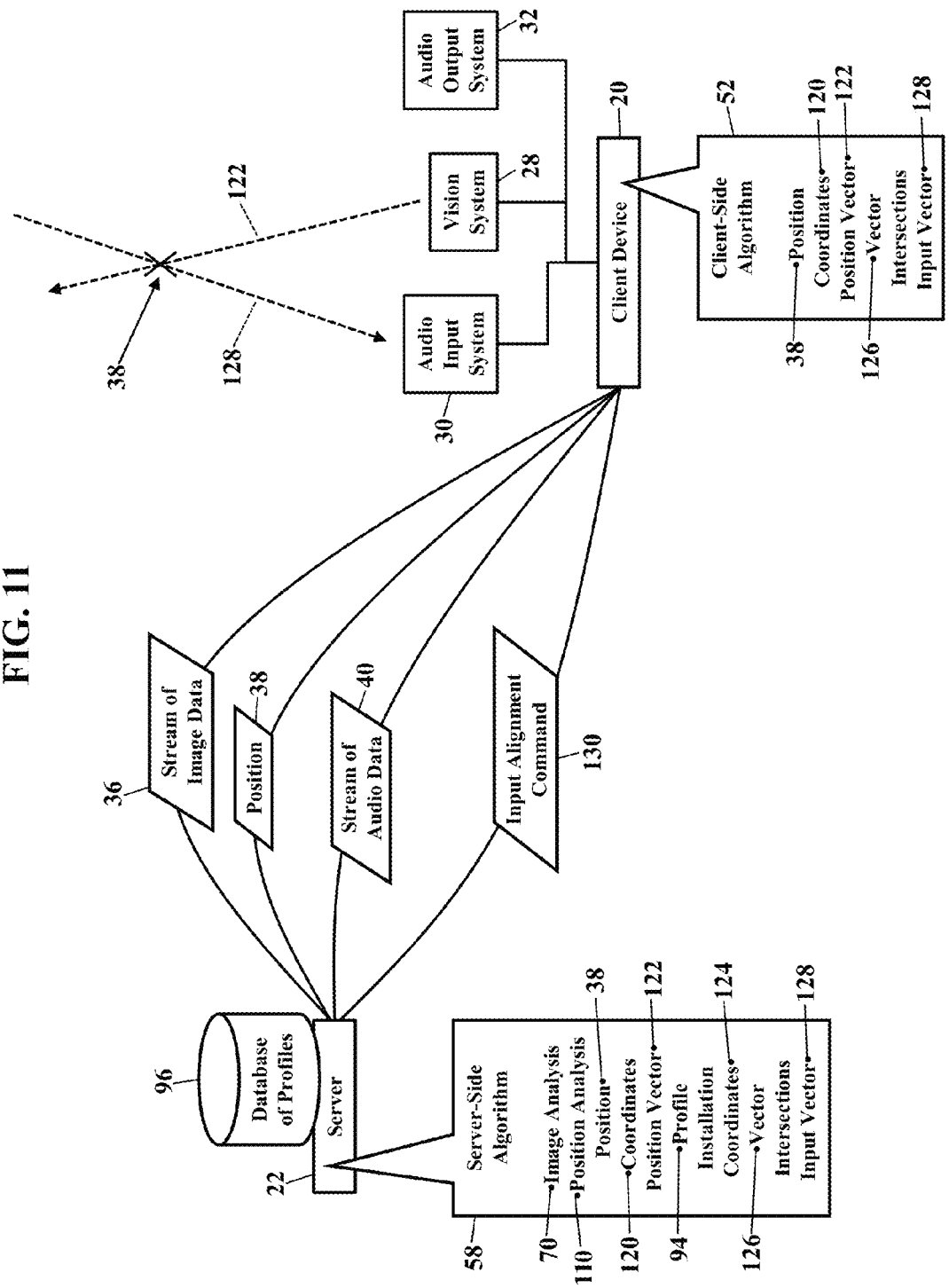
FIGS. 11-12 are schematics illustrating position coordinates, according to exemplary embodiments.
Figure 12:
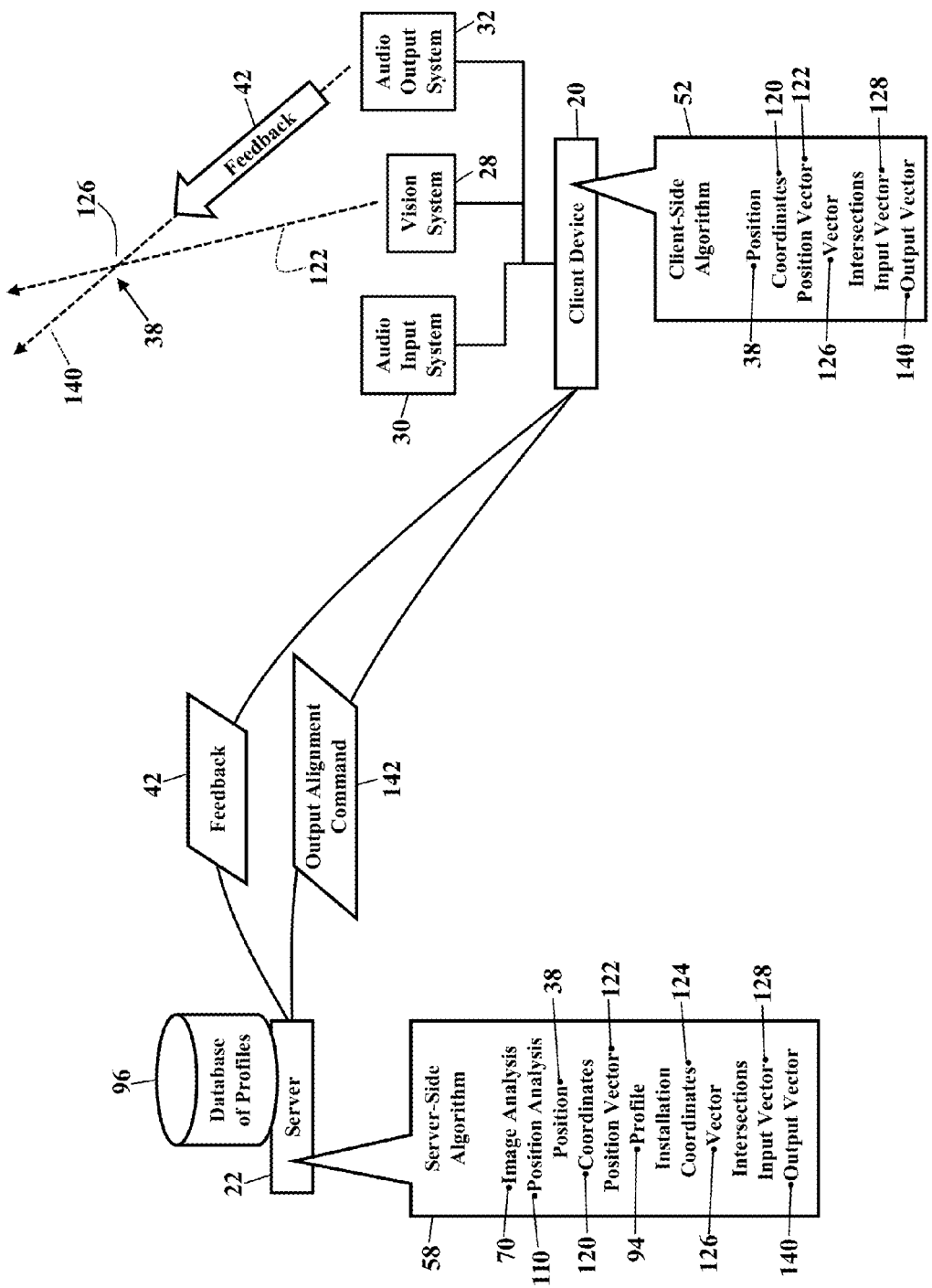

FIGS. 11-12 are schematics illustrating position coordinates, according to exemplary embodiments. Here the server 22 may calculate coordinates 120 for aiming the audio input system 30 and the audio output system 32. As the above paragraphs explained, the server 22 may use the position analysis 110 to determine the position 38 of the recognized person within the physical space 34. The position 38 of the user, though, may need to be related to a location of audio input system 30 and the audio output system 32. As the reader may understand, the vision system 28, the audio input system 30, and the audio output system 32 may have different installation locations. A media theater, for example, may have directional microphones and speakers dispersed throughout the physical space 34 for optimum audio effects. The position 38 of the recognized user, then, may need to be vectorized for alignment of the audio input system 30 and the audio output system 32.

FIG. 11 thus illustrates vectorizations. When the server 22 performs the position analysis 110, the position 38 of the recognized user may be expressed as a position vector 122 having both direction and depth within the physical space 34. The position 38 of the recognized user, in other words, may be expressed as a three-dimensional vector in a coordinate system. Once the position vector 122 is determined, the server 22 may consult the database 96 of profiles for the profile 94 of the client device 20. The profile 94 of the client device 20 stores information describing installation coordinates 124 associated with the client device 20. The profile 94, for example, may describe the installation locations of the audio input system 30 and the audio output system 32 relative to the installation location of the vision system 28 within the physical space 34. Each microphone in the audio input system 30, for example, may have its own associated installation coordinates 124. Each speaker in the audio output system 32 may also have its own associated installation coordinates 124. A camera of the vision system 28 may, likewise, have its own associated installation coordinates 124. So, when the server 22 determines the position vector 122 associated with the recognized user, the server 22 may also relate the position vector 122 to the installation coordinates 124.

FIG. 11 also illustrates vector intersections 126. Once the position vector 122 is determined, the server 22 may calculate an input vector 128 associated with a microphone in the audio input system 30. The input vector 128 describes a direction in which the corresponding microphone is pointed to obtain the stream 40 of audio data. As FIG. 11 graphically illustrates, the input vector 128 intersects the position vector 122 at the determined position 38 of the recognized person. The server 22 may thus calculate the input vector 128 from the installation coordinates 124 of the microphone to the current position 38 of the recognized user.

The server 22 may thus send an input alignment command 130 to the client device 20. The input alignment command 130 routes along the communications network (illustrated as reference numeral 24 in FIG. 1) to the network address associated with the client device 20. The input alignment command 130 instructs the client device 20 to aim the corresponding microphone in a direction of the input vector 128. A motor control mechanism may thus move and aim the microphone to the direction of the input vector 128, thus obtaining audio that is converted to the stream 40 of audio data. The client device 20 forwards the stream 40 of audio data to the server 22 for analysis, as this disclosure explains.

As FIG. 12 illustrates, the server 22 similarly aligns the audio output system 32. Once the position vector 122 is determined, the server 22 may consult the database 96 of profiles for the installation coordinates 124 associated with the audio output system 32. The server 22, for example, retrieves the installation coordinates 124 associated with a speaker of the audio output system 32. Knowing the position vector 122, the server 22 determines an output vector 140 from the speaker's installation coordinates 124 to the current position 38 of the recognized user. The output vector 140 thus describes a direction in which the corresponding speaker is pointed to beam the feedback 42 to the current position 38 of the recognized person. The output vector 140 intersects the position vector 122 at the determined position 38 of the recognized person.

The server 22 may thus send an output alignment command 142. The output alignment command 142 instructs the client device 20 to aim the corresponding speaker in a direction of the output vector 140. The output alignment command 142 routes along the communications network 24 to the network address associated with the client device 20. A motor control mechanism thus aims the speaker to the direction of the output vector 140, thus directing the feedback 42 to the determined position 38 of the recognized person.

Figure 13:
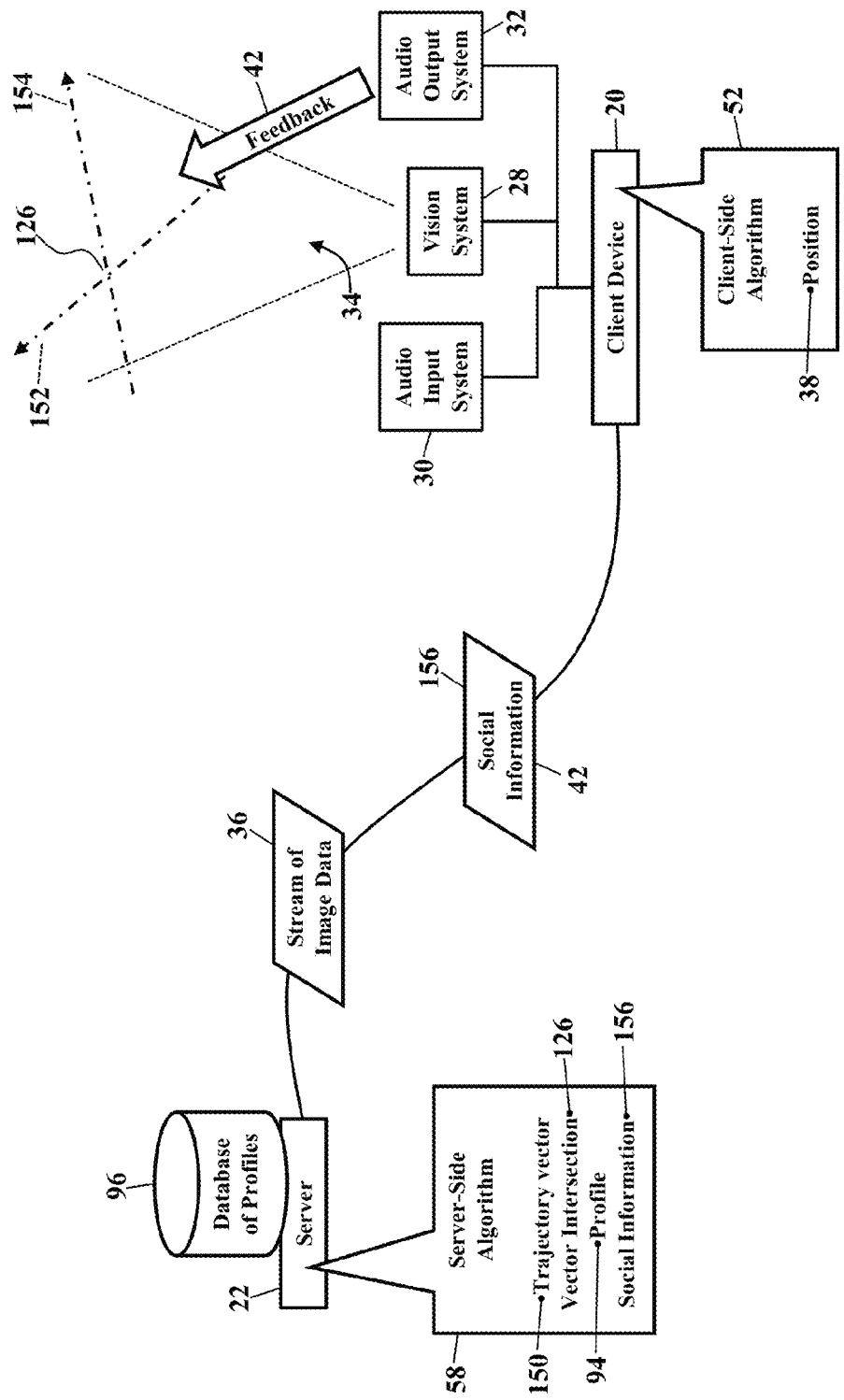
FIGS. 13-14 are schematics illustrating social interactions, according to exemplary embodiments.
Figure 14:
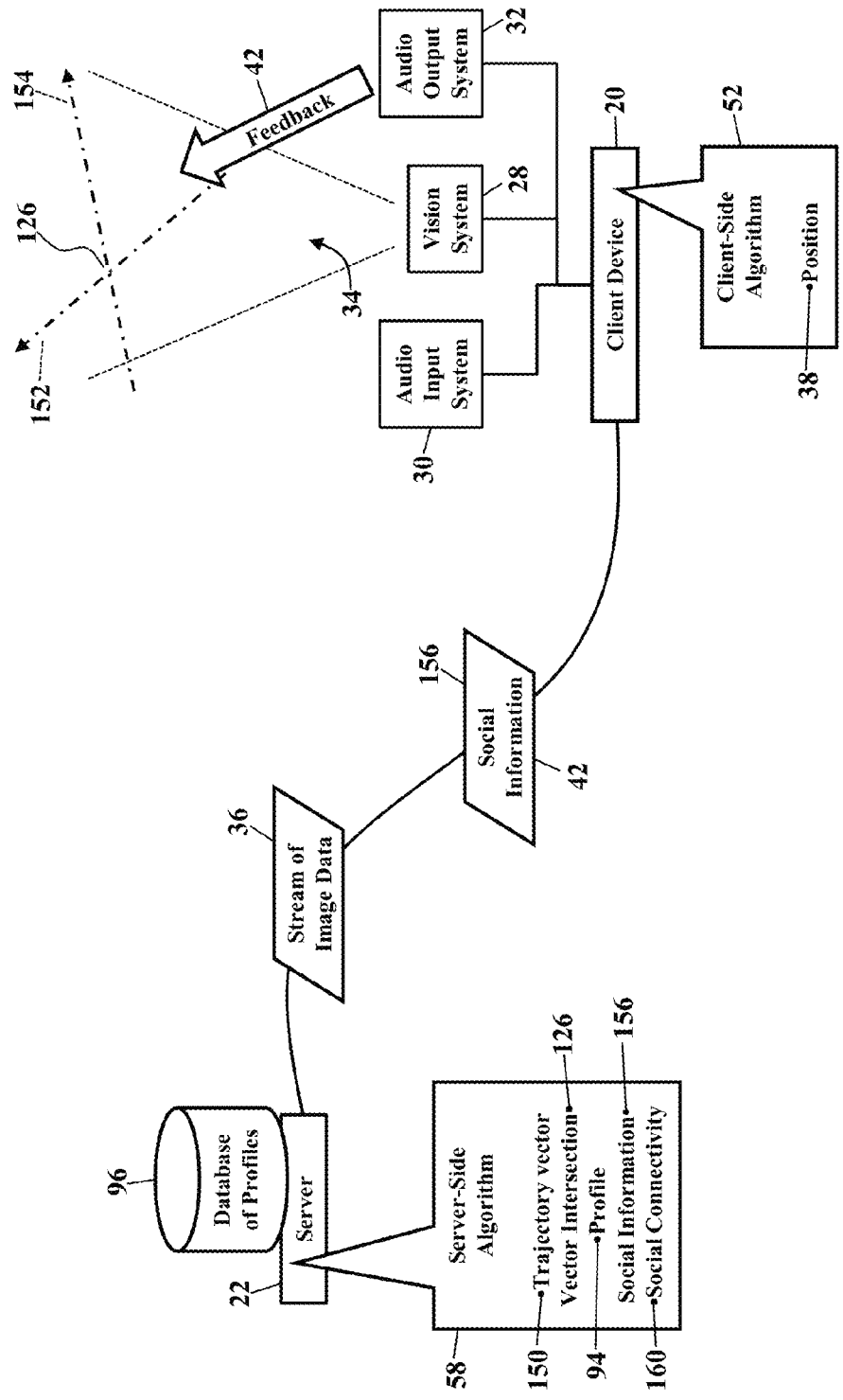

FIGS. 13-14 are schematics illustrating social interactions, according to exemplary embodiments. Here exemplary embodiments anticipate social interactions as a recognized user moves in a crowd. As a recognized user moves in a crowd, exemplary embodiments may predict when the recognized user will converse with another person in the room. If interaction is predicted, exemplary embodiments may stimulate social memories and provide personalized names and social connections. That is, as two people converge, the feedback 42 may provide the name of the approaching person, along with employment and family information. The feedback 42, in other words, helps jog memories and helps avoid embarrassing social situations.

The server 22 may thus determine a trajectory for the recognized person. As this disclosure explains, exemplary embodiments may track the movements of one or more recognized persons. As each person's movement is tracked, the server 22 may determine a trajectory vector 150 associated with recognized person's movements. As the recognized people mingle, some trajectory vectors 150 will intersect. FIG. 13, for example, illustrates two trajectory vectors 152 and 154. Each trajectory vector 152 and 154 is associated with a different, recognized person within the stream 36 of image data of the physical space 34. As each recognized person moves, their respective direction may be linearly projected at a rate of movement. As the trajectory vectors 152 and 154 are determined, the server 22 may extrapolate their movement to determine that the two trajectory vectors 152 and 154 will intersect in the future. If the two trajectory vectors 152 and 154 are projected to intersect within some threshold period of time, the server 22 may infer the two corresponding people will socially interact at the vector intersection 126.

The server 22 may thus facilitate social interactions. When the two trajectory vectors 152 and 154 are projected to intersect, the server 22 may retrieve social information 156 associated with each respective person. The server 22 may again query the database 96 of profiles for the profile 94 associated with each recognized person. The server 22 then queries each respective profile 94 for each person's social information 156. Each person's social information 156, for example, may include their name, their spouse's name, and their children's names. The server 22 then sends the social information 156 to the client device 20 as the feedback 42. The client device 20 aims the social information 156 to the current position 38 of the respective person, as this disclosure explains.

The social information 156 helps jog memories. As two people converge, the server 22 can provide the personal, isolated feedback 42 of the approaching social interaction. The feedback 42 is preferably beamed for hearing just prior to the actual intersection 126, thus audibly providing names and other important social information 156 prior to interaction. Each person is thus audibly, but privately, informed of the other person's name and other social information 156. Social interaction may thus commence with less awkward moments of memory loss.

FIG. 14 illustrates social connectivity 160. When the two trajectory vectors 152 and 154 are projected to intersect, the server 22 may also determine how the converging two people are socially connected. The social information 156 may be expansive and describe an employment history, clubs, memberships, sports, activities, and any other affiliations. The social information 156, in other words, may be as minimal or expansive as the person wishes to reveal. The server 22, for example, may determine that the converging people work for the same employer, attend the same church, or share a passion for some sports team. The server 22 may thus compare each person's social information 156 and determine matching entries. Any matches between their social information 156 helps determine how the two people are socially connected. A comparison of the social information 156, for example, may reveal that the two people may have a common current or past employer. Their children may have a common school or team affiliation. The server 22 may even submit queries to Internet search engines to further determine the social connectivity 160 between the converging people. The server 22 may then send the social connectivity 160 to the client device 20 for beaming to the respective user.

Figure 15:
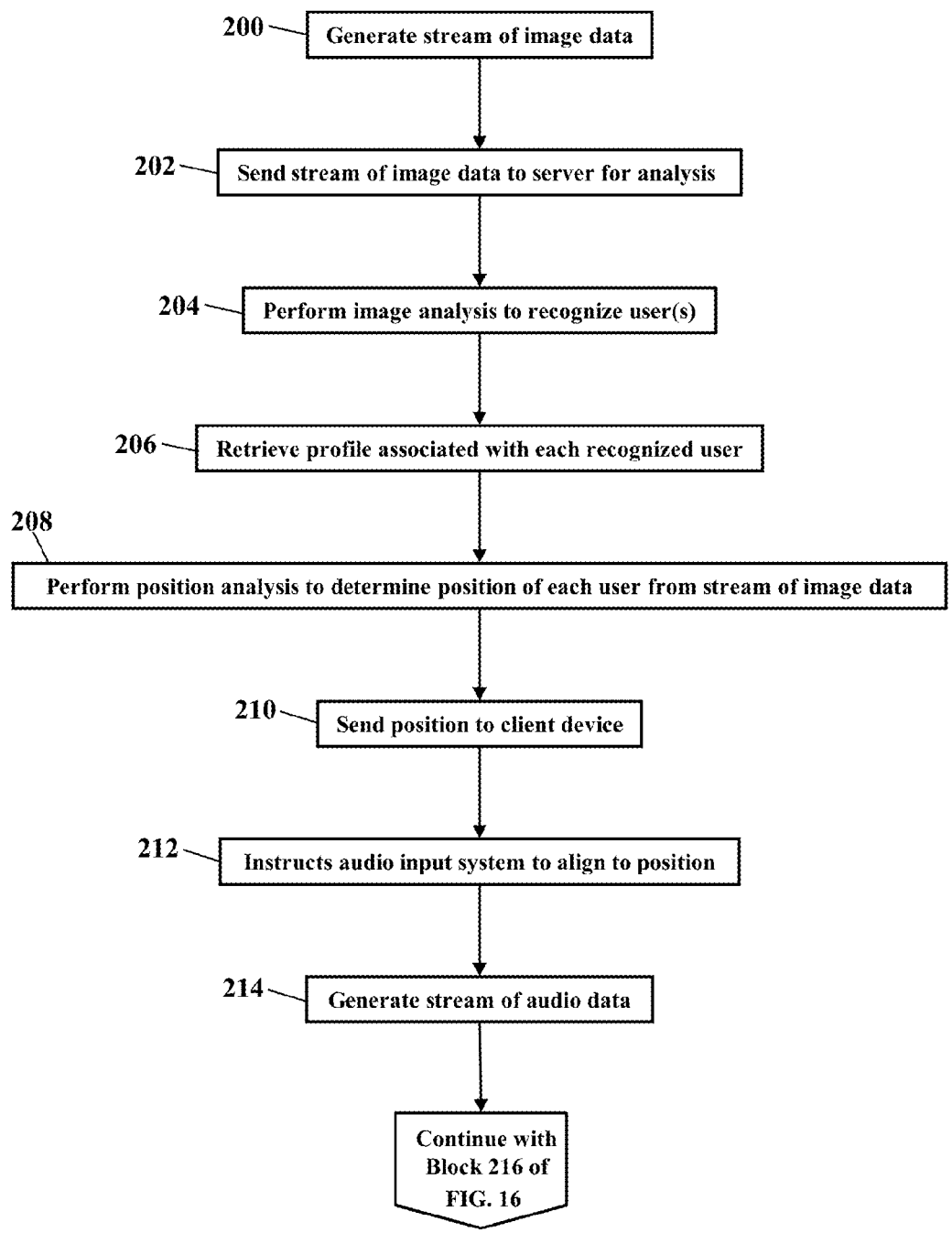
FIGS. 15-16 are flowcharts illustrating a method for voice control, according to exemplary embodiments.
Figure 16:
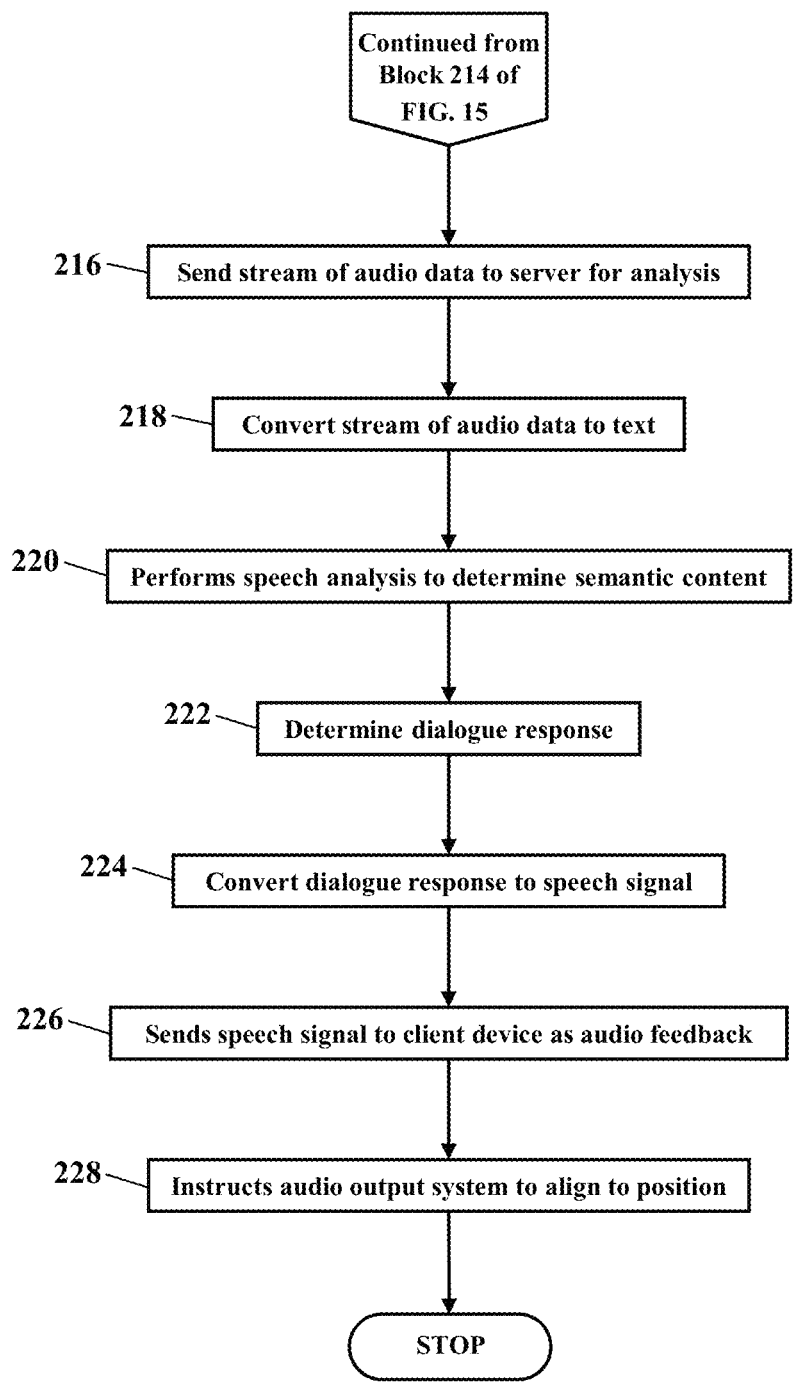

FIGS. 15-16 are flowcharts illustrating a method for voice control, according to exemplary embodiments. The vision system 28 generates the stream 36 of image data (Block 200). The stream 36 of image data is sent to the server 22 for analysis (Block 202). The server 22 performs the image analysis 70 to recognize a user (Block 204). The profile 94 associated with the recognized user is retrieved (Block 206). The server 22 performs the position analysis 110 to determine the position 38 of the user from the stream 36 of image data (Block 208). The position 38 is sent to the client device 22 (Block 210). The client device 22 instructs the audio input system 30 to align a microphone to the position 38 (Block 212). The audio input system 30 generates the stream 40 of audio data (Block 214).

The flowchart continues with FIG. 16. The stream 40 of audio data is sent to the server 22 for analysis (Block 216). The server 22 converts the stream 40 of audio data to text (Block 218). The server 22 performs the speech analysis 80 to determine the semantic content (Block 220). The server 22 determines a dialogue response to the semantic content of the text (Block 222). The server 22 converts the dialogue response to a speech signal (Block 224). The server 22 sends the speech signal to the client device 22 as the audio feedback 42 (Block 226). The client device 22 instructs the audio output system 32 to align a speaker to the position 38 (Block 228).

Figure 17:
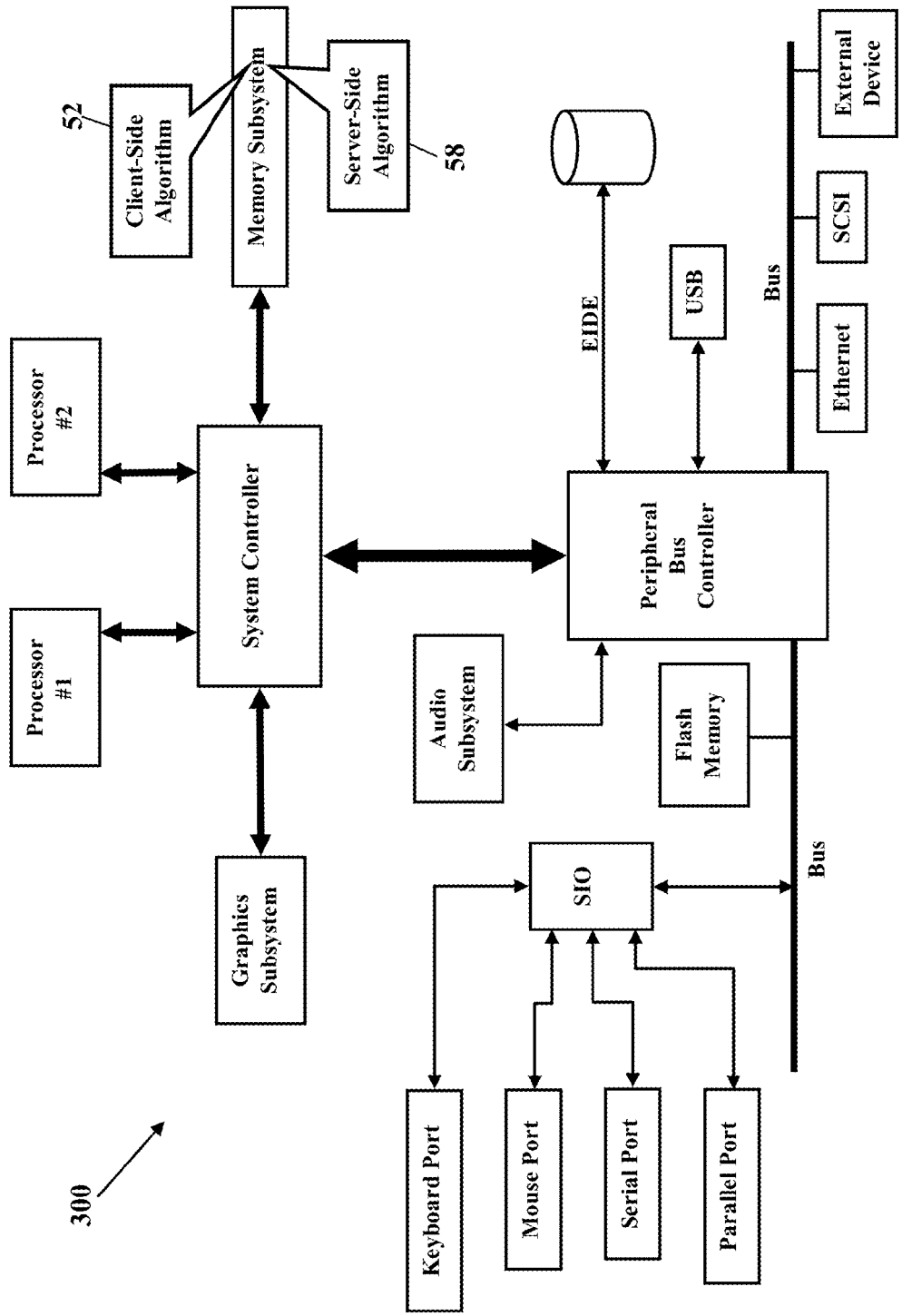
FIG. 17 is a schematic illustrating a processor-controlled device; according to exemplary embodiments.

FIG. 17 is a schematic illustrating still more exemplary embodiments. FIG. 17 is a more detailed diagram illustrating a processor-controlled device 300. As earlier paragraphs explained, the device-side algorithm 52 and/or the server-side algorithm 58 may operate in any processor-controlled device. FIG. 17, then, illustrates the device-side algorithm 52 and/or the server-side algorithm 58 stored in a memory subsystem of the processor-controlled device 300. One or more processors communicate with the memory subsystem and execute either or both applications. Because the processor-controlled device 300 is well-known to those of ordinary skill in the art, no further explanation is needed.

Figure 18:
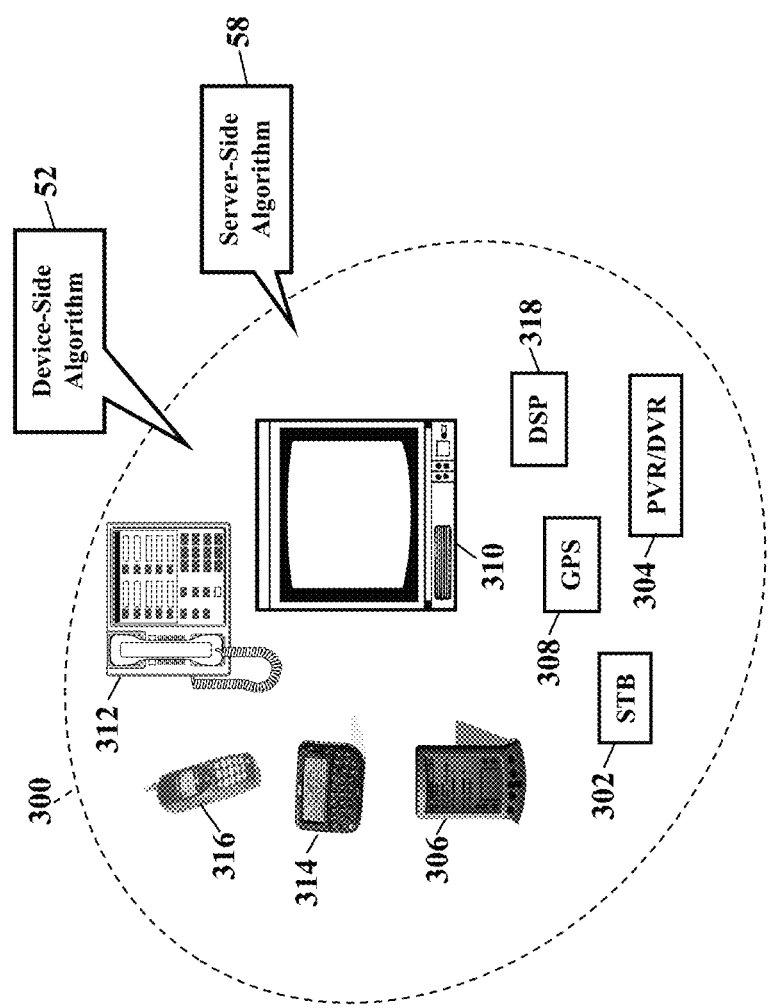
FIG. 18 depicts still more operating environments for additional aspects of the exemplary embodiments.

FIG. 18 depicts still more operating environments for additional aspects of the exemplary embodiments. FIG. 18 illustrates that the exemplary embodiments may alternatively or additionally operate within other processor-controlled devices 300. FIG. 18, for example, illustrates that the device-side algorithm 52 and/or the server-side algorithm 58 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

Figure 19:
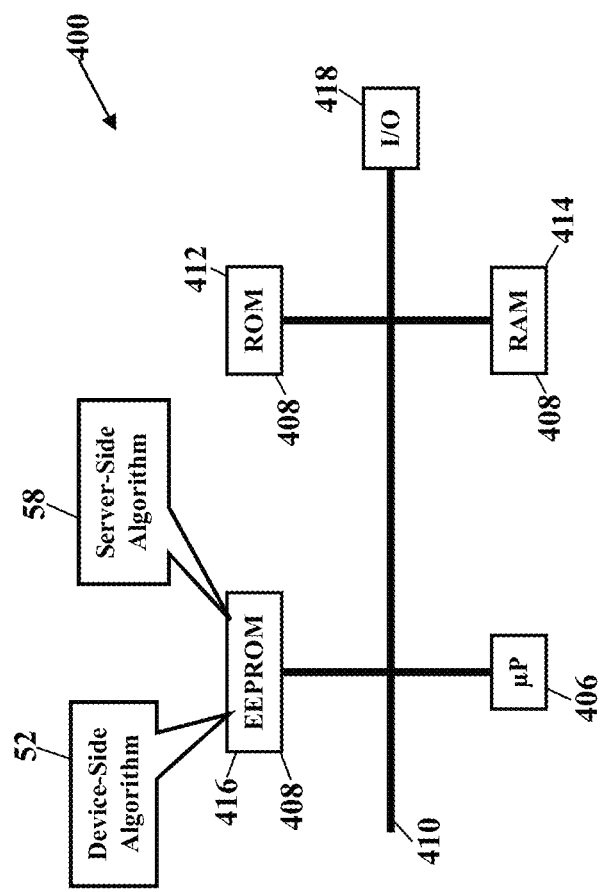

FIGS. 19-21 are schematics further illustrating various client devices for presenting personalized feedback, according to exemplary embodiments. FIG. 19 is a block diagram of a subscriber identity module 400, while FIGS. 20 and 21 illustrate, respectively, the subscriber identity module 400 embodied in a plug 402 and in a card 404. As those of ordinary skill in the art recognize, the subscriber identity module 400 may be used in conjunction with the client device (illustrated as reference numeral 20 in FIGS. 1-14). The subscriber identity module 400 stores user information and any portion of the device-side algorithm 52 and/or the server-side algorithm 58. As those of ordinary skill in the art also recognize, the plug 402 and the card 404 each interface with the client device 20.

As FIG. 19 illustrates, the subscriber identity module 400 may be processor-controlled. A microprocessor 406 (µP) communicating with memory modules 408 via a data bus 410. The memory modules 408 may include Read Only Memory (ROM) 412, Random Access Memory (RAM) and or flash memory 414, and Electrically Erasable-Programmable Read Only Memory (EEPROM) 416. The subscriber identity module 400 stores some or all of the device-side algorithm 52 and/or the server-side algorithm 58 in one or more of the memory modules 408. FIG. 19 shows the device-side algorithm 52 and/or the server-side algorithm 58 residing in the Erasable-Programmable Read Only Memory 416. However, either algorithm may alternatively or additionally reside in the Read Only Memory 412 and/or the Random Access/Flash Memory 414. An Input/Output module 418 handles communication between the Subscriber Identity Module 300 and the client device.

Figure 22:
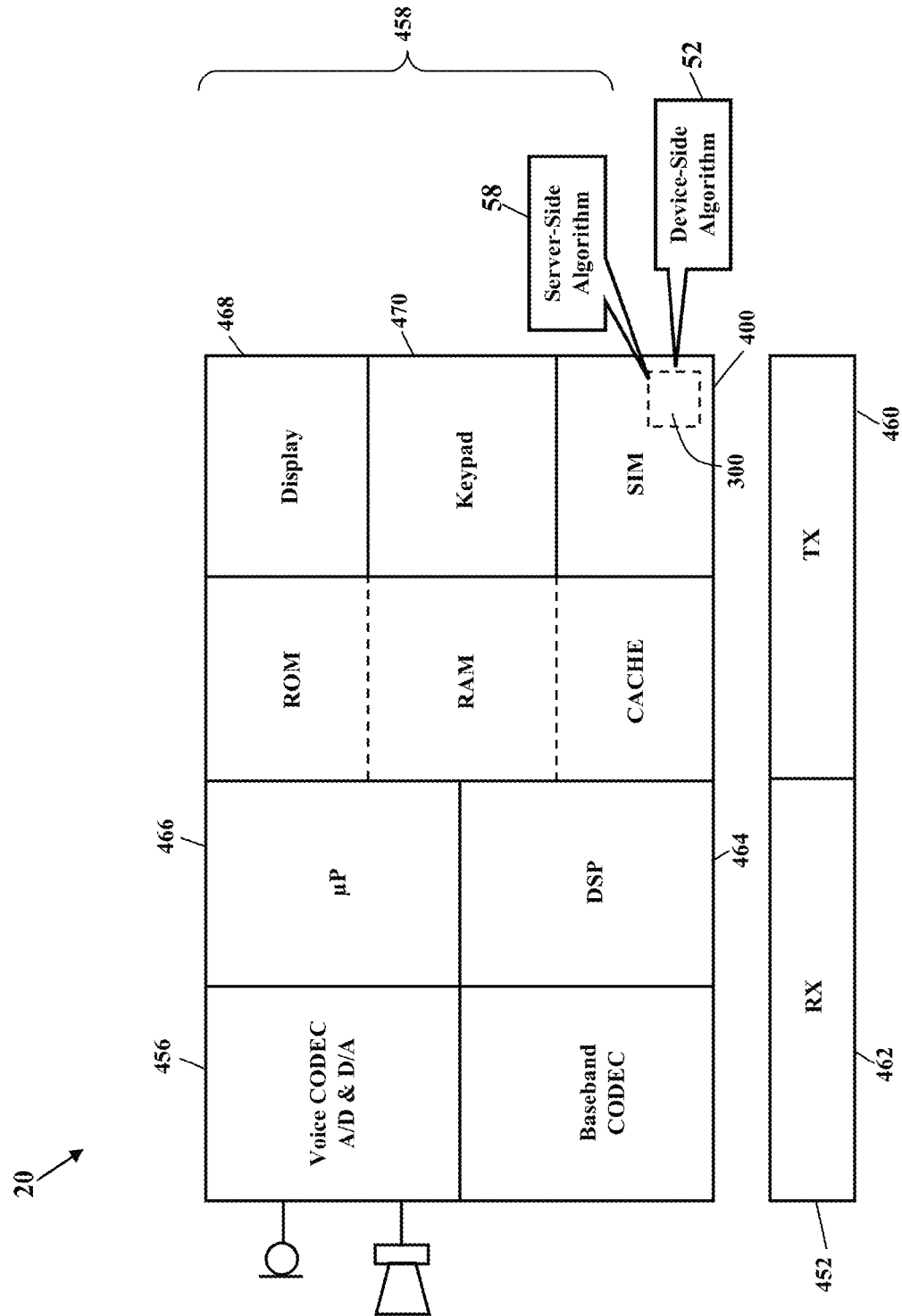
FIG. 22 is a block diagram further illustrating the client device, according to exemplary embodiments.

FIG. 22 is a block diagram further illustrating the client device 20, according to exemplary embodiments. Here the client device 20 may comprise a radio transceiver unit 452, an antenna 454, a digital baseband chipset 456, and a man/machine interface (MMI) 458. The transceiver unit 452 includes transmitter circuitry 460 and receiver circuitry 462 for receiving and transmitting radio-frequency (RF) signals. The transceiver unit 452 couples to the multiple input, multiple output ("MIMO") system 58 for converting electrical current to and from electromagnetic waves. The digital baseband chipset 456 may have a digital signal processor (DSP) 464 and performs signal processing functions for audio (voice) signals and RF signals. As FIG. 22 shows, the digital baseband chipset 456 may also include an on-board microprocessor 466 that interacts with the man/machine interface (MMI) 458. The man/machine interface (MMI) 458 may comprise a display device 468, a keypad 470, and the subscriber identity module 400. The on-board microprocessor 466 may perform TDMA, CDMA, GSM or other protocol functions and control functions. The on-board microprocessor 466 may also interface with the subscriber identity module 400 and with the device-side algorithm 52 and/or the server-side algorithm 58.

Exemplary embodiments may be applied to any signaling standard. As those of ordinary skill in the art recognize, FIGS. 19-22 may illustrate a Global System for Mobile (GSM) communications device. That is, the client device 20 may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, WI-FI®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for personalized audible feedback, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:
1. A method, comprising:
receiving, at a server, image data sent from a client device, the client device associated with a network address;
determining, by the server, a face recognized using the image data;
performing, by the server, a position analysis using the image data to determine a position associated with the face;
determining, by the server, a language preference associated with the face recognized using the image data;

sending, by the server, an audio language track to the client device associated with the network address, the audio language track corresponding to the language preference associated with the face; and sending, from the server, an instruction to the client device associated with the network address, the instruction instructing the client device to align an audio output system to the position such that the audio language track is aligned to the position associated with the face.

2. The method of claim 1, further comprising performing a web-based facial recognition analysis on the image data to recognize the face.

3. The method of claim 1, further comprising retrieving a profile associated with the face recognized using the image data.

4. The method of claim 1, further comprising determining a name associated with the face recognized using the image data.

5. The method of claim 4, further comprising querying an electronic database of profiles for the name associated with the face, the electronic database of profiles storing electronic associations between different profiles and different names including the name associated with the face.

6. The method of claim 5, further comprising retrieving a profile of the different profiles having an electronic association with the name.

7. The method of claim 1, further comprising associating different audio language tracks to content information.

8. A system, comprising:
a processor; and
a memory device, the memory device storing instructions, the instructions when executed causing the processor to perform operations, the operations comprising:
receiving a stream of image data sent from a client device, the client device associated with a network address;
performing a facial recognition analysis on the stream of image data to recognize faces;
performing a position analysis on the stream of image data to determine positions associated with the faces;
determining different language preferences associated with the faces recognized using the stream of image data;
sending different audio language tracks to the client device associated with the network address, each audio language track of the different audio language tracks corresponding to the different language preferences associated with the faces;
sending the positions to the client device associated with the network address; and
sending an instruction to the client device associated with the network address, the instruction instructing the client device to align an audio output system to the positions for outputting the different audio language tracks.

9. The system of claim 8, wherein the operations further comprise aligning a microphone to one of the positions.

10. The system of claim 8, wherein the operations further comprise retrieving a profile associated with each one of the faces.

11. The system of claim 8, wherein the operations further comprise determining a name associated with a face of the faces.

12. The system of claim 11, wherein the operations further comprise querying an electronic database of profiles for the name associated with the face, the electronic database of profiles storing electronic associations between different profiles and different names including the name associated with the face.

13. The system of claim 12, wherein the operations further comprise retrieving a profile of the different profiles having an electronic association with the name.

14. The system of claim 8, wherein the operations further comprise associating the different audio language tracks to content information.

15. A memory device storing instructions that when executed cause a processor to perform operations, the operations comprising:
receiving image data sent from a client device, the client device associated with a network address;
performing a web-based facial recognition analysis to recognize faces digitally described within the image data;
performing a web-based position analysis to determine positions within a physical space associated with the faces;
determining different language preferences associated with the faces recognized using the image data;
sending different audio language tracks to the client device associated with the network address, each audio language track of the different audio language tracks corresponding to the different language preferences associated with the faces; and
sending alignment commands to the client device associated with the network address, each one of the alignment commands instructing the client device to aim one of the different audio language tracks to a different one of the positions.

16. The memory device of claim 15, wherein the operations further comprise retrieving a profile associated with each one of the faces.

17. The memory device of claim 15, wherein the operations further comprise determining a name associated with a face of the faces.

18. The memory device of claim 17, wherein the operations further comprise querying an electronic database of profiles for the name associated with the face, the electronic database of profiles storing electronic associations between different profiles and different names including the name associated with the face.

19. The memory device of claim 18, wherein the operations further comprise retrieving a profile of the different profiles having an association with the name.

20. The memory device of claim 15, wherein the operations further comprise associating the different audio language tracks to content information.

* * * * *